US012710866B2

(12) United States Patent
Zhang et al.

(10) Patent No.: US 12,710,866 B2
(45) Date of Patent: Aug. 18, 2026

(54) COMPACTION METHOD AND DEVICE FOR SORTED STRINGS TABLE FILES

(71) Applicant: SAMSUNG ELECTRONICS CO., LTD., Suwon-si (KR)

(72) Inventors: Yiwen Zhang, XiAn (CN); Yanlong Yang, XiAn (CN); Yuqi Zhang, XiAn (CN); Xing He, XiAn (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 18/424,321

(22) Filed: Jan. 26, 2024

(65) Prior Publication Data

US 2024/0377948 A1 Nov. 14, 2024

(30) Foreign Application Priority Data

May 10, 2023 (CN) ......................... 202310526530.9

(51) Int. Cl.
*G06F 3/06* (2006.01)
*G06F 16/174* (2019.01)

(52) U.S. Cl.
CPC .......... *G06F 3/0608* (2013.01); *G06F 3/0638* (2013.01); *G06F 3/0679* (2013.01); *G06F 16/1744* (2019.01)

(58) Field of Classification Search
CPC .. G06F 16/1744; G06F 3/0608; G06F 3/0638; G06F 3/0679
See application file for complete search history.

(56) References Cited

U.S. PATENT DOCUMENTS 10,740,300 B1 8/2020 Lakshman et al.
2019/0179559 A1* 6/2019 Bolkhovitin ............ G06F 3/064
(Continued)

FOREIGN PATENT DOCUMENTS

CN 110851434 A 2/2020
CN 113253932 A 8/2021
(Continued)

OTHER PUBLICATIONS

Yang et al., Optimizing NoSQL DB on Flash: A Case Study of RocksDB, https://ieeexplore.ieee.org/stamp/stamp.jsp?tp=&arnumber=7518376, 2015 IEEE 12th Intl Conf on UIC; 2015 IEEE 12th Intl Conf on ATC; and 2015 IEEE 15th Intl Conf on ScalCom, Aug. 10-14, 2015, 8 pp. (Year: 2015).*

*Primary Examiner* — Marc S Somers
(74) *Attorney, Agent, or Firm* — Sughrue Mion, PLLC

(57) ABSTRACT

Provided are a compaction method and device for Sorted String Table (SST) files stored in zones of a Zoned Namespace Solid State Drive. The method includes: determining compaction priorities of a first plurality of SST files in a first level of a LSM-Tree based on attribute information of a first plurality of zones corresponding to the first plurality of SST files and a second plurality of SST files in a second level of the LSM-Tree, wherein the second level is adjacent and higher to the first level, a key range of the first plurality of SST files overlaps key ranges of SST files in the second level, and a key range of the second plurality of SST files overlaps key ranges of the first plurality of SST files. The method includes performing a compaction operation on an SST file having a highest compaction priority among the first plurality of SST files.

18 Claims, 14 Drawing Sheets

(56) References Cited

U.S. PATENT DOCUMENTS

2021/0397345 A1 12/2021 Jawahar et al.
2023/0033773 A1* 2/2023 Choi .................... G06F 16/2282
2023/0153006 A1 5/2023 Zhang et al.
2023/0229651 A1* 7/2023 Dayan ................. G06F 16/2358
707/797

FOREIGN PATENT DOCUMENTS

CN 114281775 A 4/2022
CN 114297164 A 4/2022

* cited by examiner

FIG. 4

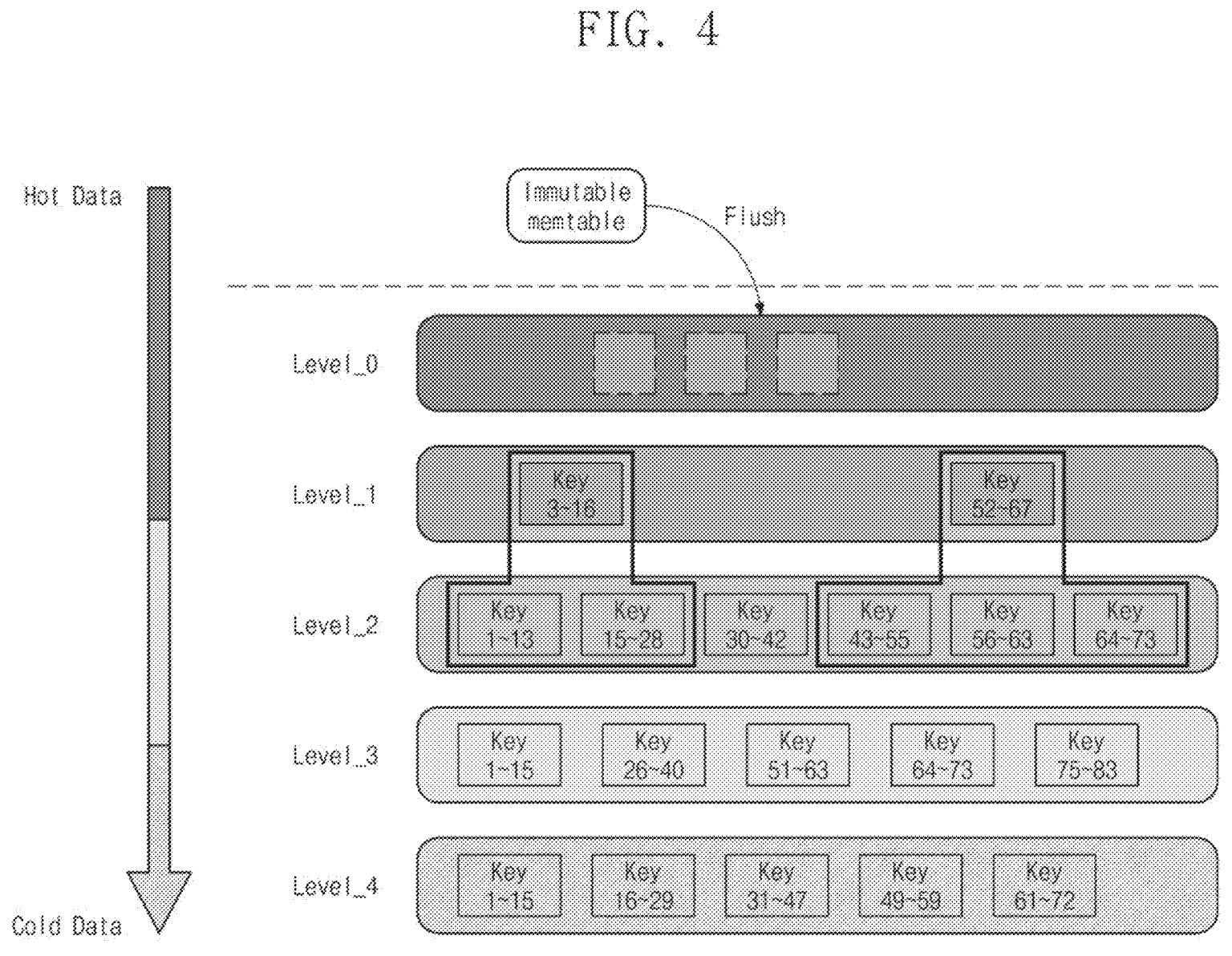

Immutable memtable

Flush

Level_0

Level_1

Key 3~16

Key 52~67

Level_2

Key 1~13

Key 15~28

Key 30~42

Key 43~55

Key 56~63

Key 64~73

Level_3

Key 1~15

Key 26~40

Key 51~63

Key 64~73

Key 75~83

Level_4

Key 1~15

Key 16~29

Key 31~47

Key 49~59

Key 61~72

Hot Data

Cold Data start_level
output_level
SST1
SST2
SST3
SST4
...
SST6
SST7
SST8
SST9
SST10
SST11
expand the files overlapping with SST2 and SST4
vector_1
SST2
SST7
SST8
vector_2
SST4
SST9
SST10
SST11
SST4
SST7
Zone1
SST9
SST10
Zone2
SST11
SST2
Zone3
SST11
SST8
Zone4
being compacted file
invalid file
valid file
free space

Figure 10:
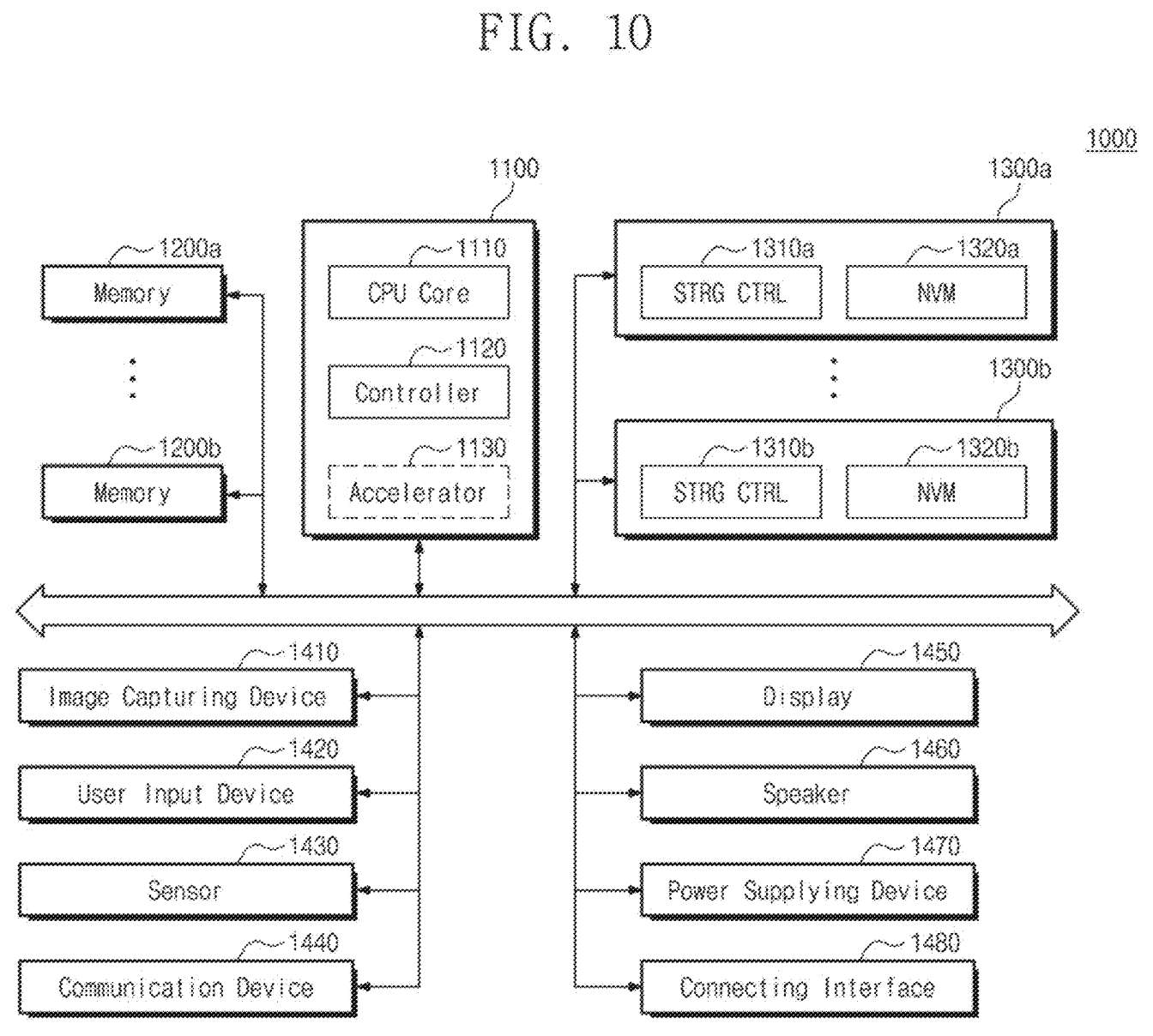

1300a
1310a STRG CTRL
1320a NVM 1300b
1310b STRG CTRL
1320b NVM 1100
1110 CPU Core
1120 Controller
1130 Accelerator 1200a Memory
1200b Memory 1410 Image Capturing Device
1420 User Input Device
1430 Sensor
1440 Communication Device
1450 Display
1460 Speaker
1470 Power Supplying Device
1480 Connecting Interface 2000
2100
UFS Host
Application
2120
UFS Driver
2130
UFS Host Controller
2110
UFS Host Register
2111
Host Memory
2140
UIC
2150
MIPI UniPro
2152
MIPI M-Phy
2151
2300
RESET_n
REF_CLK
DOUT_T
DOUT_C
DIN_T
DIN_C
2200
UFS Device
Device Memory
2240
UFS Device Controller
2210
Logical Unit #0
Logical Unit #N-1
2211
UIC
2250
MIPI UniPro
2252
MIPI M-Phy
2251
VCC
VCCQ1
VCCQ2
Regulator
2260
Storage I/F
2230
NVM
2220
Memory Unit
Memory Unit
2221

Figure 13:
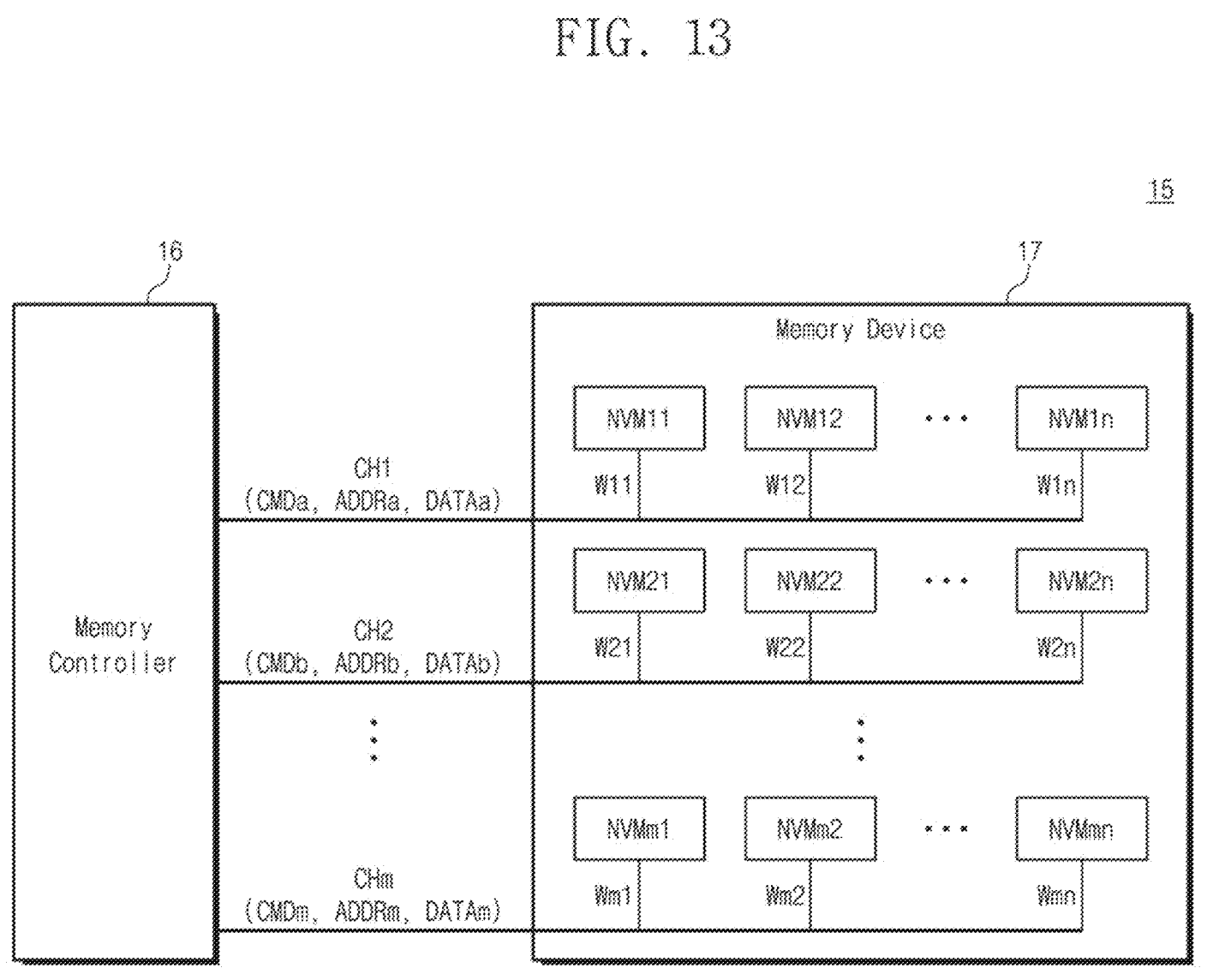

Memory Device

NVM11 NVM12 ... NVM1n

W11 W12 W1n

NVM21 NVM22 ... NVM2n

W21 W22 W2n

NVMm1 NVMm2 ... NVMmn

Wm1 Wm2 Wmn

CH1 (CMDa, ADDRa, DATAa)

CH2 (CMDb, ADDRb, DATAb)

CHm (CMDm, ADDRm, DATAm)

16

Memory Controller

COMPACTION METHOD AND DEVICE FOR SORTED STRINGS TABLE FILES

CROSS-REFERENCE TO RELATED APPLICATION

This application is based on and claims priority under 35 U.S.C. § 119 to Chinese Patent Application No. 202310526530.9, filed on May 10, 2023, in the China National Intellectual Property Administration, the disclosure of which is incorporated by reference herein in its entirety.

BACKGROUND

The disclosure relates to data storage, and more specifically, to a compaction method and device for sorted strings table (SST) files. Data stored based on a Log-Structured Merge-Tree (LSM-Tree) storage structure (e.g., a RocksDB or a LevelDB) may be stored in a Zoned Namespaces (ZNS) Solid State Drive (SSD). A compaction operation may be performed on a plurality of SST files stored in zones of a ZNS SSD of levels of an LSM-Tree, the plurality of SST files becomes invalid files in the zones and new SST files generated by the compaction operation are stored in a zone with free space of the ZNS SSD after the compaction operation. According to storage mechanism of the ZNS SSD, a zone may be reclaimed only when all the files in the zone are invalid (e.g., when there are no valid data fragments).

SUMMARY

According to an aspect of an embodiment, a compaction method for Sorted String Table (SST) files stored in zones of a Zoned Namespace (ZNS) Solid State Drive (SSD) includes: determining compaction priorities of a first plurality of SST files in a first level of a Log Structure Merge Tree (LSM-Tree) based on attribute information of a first plurality of zones corresponding to the first plurality of SST files and a second plurality of SST files in a second level of the LSM-Tree, wherein the second level is adjacent to the first level and higher than the first level, a key range of each of the first plurality of SST files overlaps at least part of key ranges of SST files in the second level, and a key range of each of the second plurality of SST files overlaps at least part of key ranges of the first plurality of SST files; and performing a compaction operation on an SST file having a highest compaction priority among the first plurality of SST files.

According to an aspect of an embodiment, a compaction device for Sorted String Table (SST) files stored in zones of a Zoned Namespace (ZNS) Solid State Drive (SSD) includes: a memory storing instructions; and one or more processors configured to execute the instructions to: determine compaction priorities of a first plurality of SST files in a first level of a Log Structure Merge Tree (LSM-Tree) based on attribute information of a first plurality of zones corresponding to the first plurality of SST files and a second plurality of SST files in a second level of the LSM-Tree, wherein the second level is adjacent to the first level and higher than the first level, a key range of each of the first plurality of SST files overlaps at least part of key ranges of SST files in the second level, and a key range of each of the second plurality of SST files overlaps at least part of key ranges of the first plurality of SST files; and perform a compaction operation on an SST file having a highest compaction priority among the first plurality of SST files.

According to an aspect of an embodiment, an electronic device includes: a memory configured to store one or more instructions; a plurality of storage devices; and a host processor configured to execute the one or more instructions to cause the host processor to perform a compaction method.

According to an aspect of an embodiment, a host storage system includes: a host, comprising a host memory and a host controller; and a storage device, wherein the host memory stores instructions that when executed by the host controller cause the host controller to perform a compaction method.

According to an aspect of an embodiment, a Universal Flash Storage (UFS) system includes: a UFS host configured to perform a compaction method; a UFS device; and a UFS interface for a communication between the UFS device and the UFS host.

According to an aspect of an embodiment, a storage system includes: a memory device; and a memory controller configured to perform a compaction method.

According to an aspect of an embodiment, a data center system includes: a plurality of application servers; and a plurality of storage servers, wherein each of the plurality of application servers and/or the plurality of storage servers is configured to perform a compaction method.

According to an aspect of an embodiment, a non-transitory computer readable medium stores computer readable program code or instructions which are executable by a processor to perform a compaction method for Sorted String Table (SST) files stored in zones of a Zoned Namespace (ZNS) Solid State Drive (SSD). The method includes: determining compaction priorities of a first plurality of SST files in a first level of a Log Structure Merge Tree (LSM-Tree) based on attribute information of a first plurality of zones corresponding to the first plurality of SST files and a second plurality of SST files in a second level of the LSM-Tree, wherein the second level is adjacent to the first level and higher than the first level, a key range of each of the first plurality of SST files overlaps at least part of key ranges of SST files in the second level, and a key range of each of the second plurality of SST files overlaps at least part of key ranges of the first plurality of SST files; and performing a compaction operation on an SST file having a highest compaction priority among the first plurality of SST files.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a schematic diagram illustrating examples of SST files according to one or more embodiments;

FIG. 10 is a schematic diagram of an electronic device according to one or more embodiments;

FIG. 13 is a block diagram of a storage system according to one or more embodiments.

DETAILED DESCRIPTION

Figure 1:
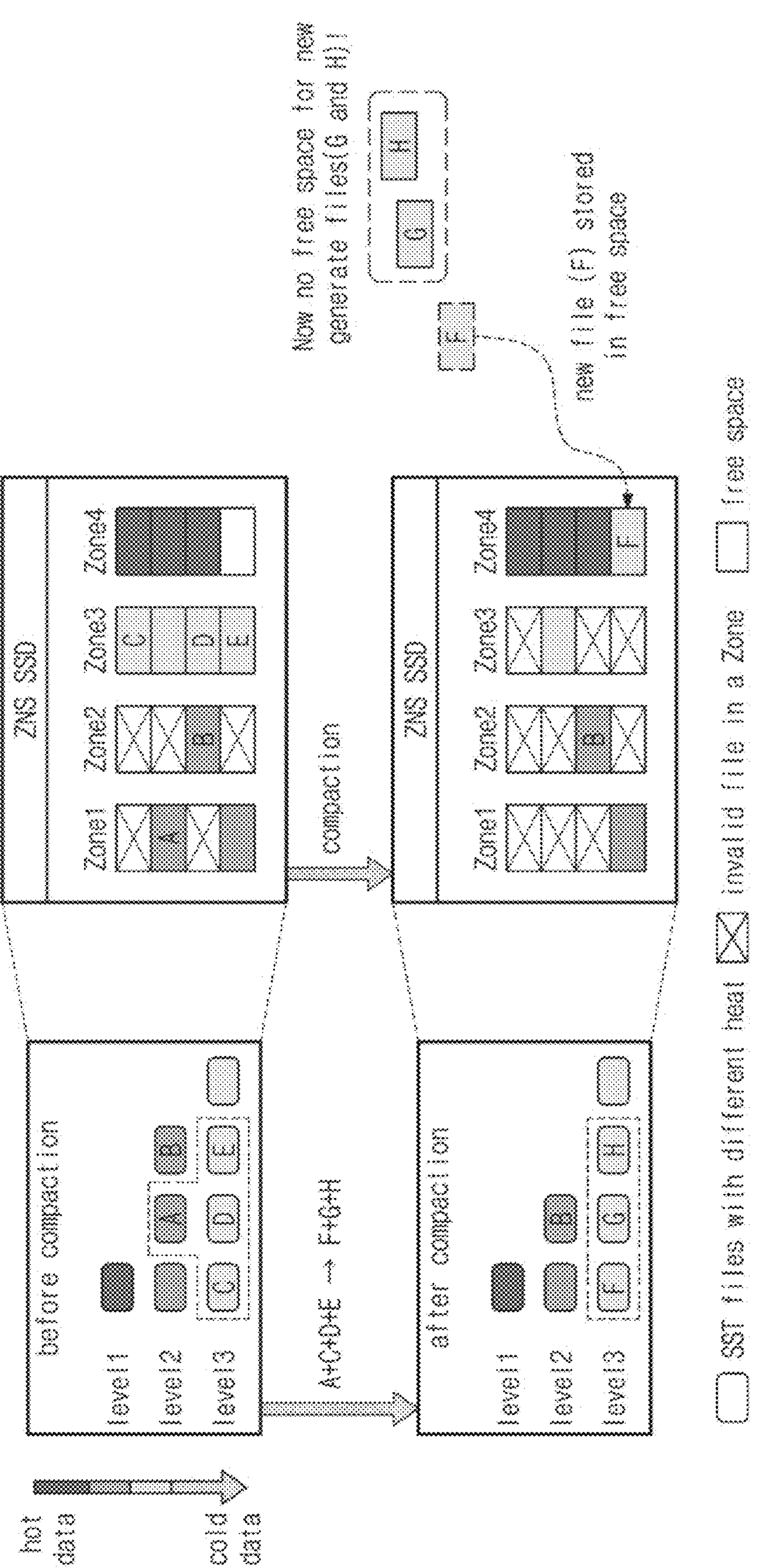
FIG. 1 is a schematic diagram illustrating a compaction process in the related art.

Hereinafter, various example embodiments of the present disclosure are described with reference to the accompanying drawings, in which like reference numerals are used to depict the same or similar elements, features, and structures. However, the present disclosure is not intended to be limited by the various embodiments described herein to a specific embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include," "include," and "have", used herein, indicate disclosed functions, operations, or the existence of elements, but does not exclude other functions, operations, or elements.

For example, the expressions "A or B," "at least one of A or B" or may indicate only A, only B, or both A and B.

In various embodiments of the present disclosure, it is intended that when a component (e.g., a first component) is referred to as being "coupled" or "connected" with/to another component (e.g., a second component), the component may be directly connected to the other component or may be connected through another component (e.g., a third component). In contrast, when a component (e.g., a first component) is referred to as being "directly coupled" or "directly connected" with/to another component (e.g., a second component), another component (e.g., a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (e.g., an embedded processor) for performing a corresponding operation or a general purpose processor (e.g., a central processing unit (CPU) or an application processor (AP)) for performing corresponding operations by executing at least one software program stored in a memory device.

The terms used herein are to describe certain embodiments of the present disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

In some aspects, compaction strategy may determine a compaction order of SST files in a start level based on key overlapping ratios of the SST files in the start level in relation to SST files in an output level that participate in the compaction operation. Such a compaction strategy may cause a delay in compacting in priority an SST file corresponding to a zone capable of being reclaimed as soon as possible, which in turn may result delay in recovering the zone in time, thereby reducing utilization rate of storage space of the ZNS SSD. Some embodiments of data compaction mechanisms disclosed herein may improve the utilization rate of space of a ZNS SSD is needed.

In the related art, an LSM-Tree database engine selects SST files in levels that are preferentially involved in a compaction operation based on a key minimum overlapping ratio (kMinOverlappingRatio). Specifically, when the compaction operation is performed on SST files in a certain level and a higher level adjacent to certain level, an SST file of the certain level a key range of which overlaps least with key ranges of files in the higher level is preferentially selected for the compaction operation.

FIG. 1 is a schematic diagram illustrating compaction process in the related art.

Referring to FIG. 1, when it is determined to perform compaction for level 2 and level 3, for each file (e.g., files A and B) of level 1 having a key range overlapping at least partially with key ranges of files in level 3, overlapping bytes (overlapping_bytes) of the each file of level 1 and files each of which has a key range overlapping at least partially with the key range of the each file of level 1 of level 2 are determined, and then a ratio corresponding to the each file of level 1 is calculated (the ratio=the overlapping_bytes*1024/size of compensated documents(compensed_file_size)), ratios corresponding to files of level 2 are ranked in ascending order, and the file having the smallest ratio of level 2 is compacted first.

For example, based on the obtained ratios, it is determined that file A has the smallest ratio and, therefore, a compaction operation is performed on file A first, e.g., the compaction operation is firstly performed on file A and files C, D and E each of which has a key range overlapping at least partially with the key range of file A.

New files obtained by the compaction operation are files F, G and H in level 3, and then the files F, G and H are stored in free space of zones of a ZNS SSD. Since there is no free space to store files G and H after storing file F, this results in a writing failure. Also, referring to FIG. 1, there are invalid file fragments in zone 1 and zone 2. However, since there are valid data fragments in the two zones, zone 1 and zone 2 cannot be reclaimed for storing files G and H.

According to the related art, if a file of level 2 has a lower compaction priority and there are a large number of invalid files in a zone (e.g., the zone where the file is located) corresponding to the file, the file cannot be deleted by a compaction operation for a long time, and therefore the zone occupied by the file cannot be reclaimed in time, and accordingly space utilization rate of the ZNS SSD is reduced.

Figure 2:
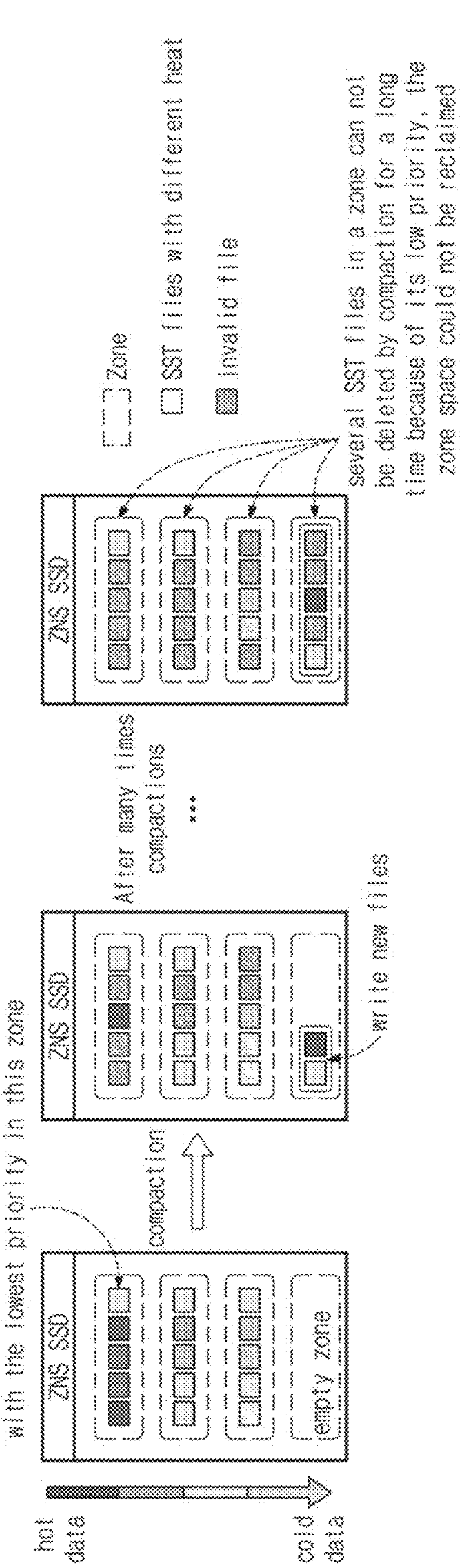
FIG. 2 is a schematic diagram illustrating a compaction process in the related art.

FIG. 2 is a schematic diagram illustrating compaction process in the related art.

Referring to FIG. 2, for a file with the lowest compaction priority, after multiple compaction operations, although a zone corresponding to the file has a large number of invalid data fragments, the zone corresponding to the file cannot be reclaimed in a timely manner because the file did not participate in the compaction operations due to the lowest compaction priority and thus cannot become an invalid file, thereby resulting in low space utilization rate of the ZNS SSD.

Figure 3:
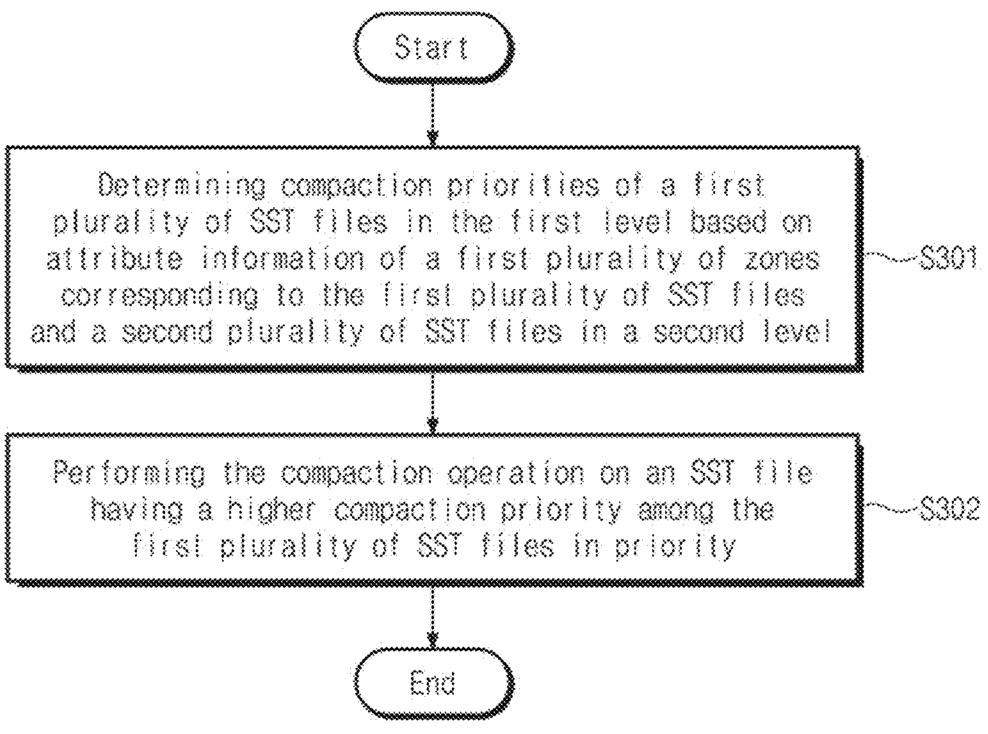
FIG. 3 is a flowchart illustrating a compaction method for sorted strings table (SST) files in according to one or more embodiments.

FIG. 3 is a flowchart illustrating a compaction method for SST files according to one or more embodiments.

Referring to FIG. 3, at operation S301, in response to determining that a compaction operation needs to be performed on a first level of a Log Structure Merge tree (LSM-Tree), compaction priorities of a first plurality of SST files in the first level is determined based on attribute information of a first plurality of zones corresponding to the first plurality of SST files and a second plurality of SST files in a second level, wherein a key range of each of the first plurality of SST files overlaps at least partially with key ranges of SST files in the second level, and a key range of each of the second plurality of SST files overlaps at least partially with key ranges of the first plurality of SST files, wherein the second level indicates a level of the LSM-Tree that is adjacent to the first level and higher than the first level.

As an example, it may be determined that the compaction operation needs to be performed on the first level when the number of the SST files in the first level exceeds a set value or when a size of the SST files in the first level exceeds a predetermined capacity (e.g., the capacity of the first level or less).

As an example, the attribute information may be information on space utilization rate of the first plurality of zones.

It should be understood by those skilled in the art that the first level is a start level involved in the compaction operation and the second level is an output level involved in the compaction operation.

For example, if level capacity (e.g., a size of files in level 1) of level 1 exceeds a target size for level 1, it is determined that the compaction operation is performed on level 1, wherein level 1 is the start level involved in the compaction operation and level 2 is the output level involved in the compaction operation.

FIG. 4 is a schematic diagram illustrating examples of SST files according to one or more embodiments.

Referring to FIG. 4, when it is determined that the compaction operation is performed on level 1, level 1 is the first level and level 2 is the second level. As can be seen, the key range of a file of level 1 with the key range of 3-16 and the key range of a file of level 1 with the key range of 52-67 overlap at least partially with the key ranges of SST files in level 2.

As an example, the attribute information of the first plurality of zones includes at least one of a size of valid files in each of the first plurality of zones, a size of invalid files in the each of the first plurality of zones, a number of the invalid files in the each of the first plurality of zones, and expected expiration times of the valid files in the each of the first plurality of zones.

As an example, the determining the compaction priorities of the first plurality of SST files includes: determining the compaction priorities of the first plurality of SST files based on attribute information of a second plurality of zones corresponding to each of the first plurality of SST files and a third plurality of SST files corresponding to the each SST file in the second level, wherein a key range of each of the third plurality of SST files overlaps at least partially with a key range of the each SST file, and wherein the attribute information of the second plurality of zones corresponding to the each of the first plurality of SST files and the third plurality of SST files includes: a ratio of a size of valid files in each of the second plurality of zones to storage capacity of the each of the second plurality of zones, a ratio of a size of invalid files in the each of the second plurality of zones to the storage capacity of the each of the second plurality of zones, a ratio of a number of the invalid files in the each of the second plurality of zones to a number of all files in the each of the second plurality of zones, and an average value of remaining lifetimes of the valid files in the each of the second plurality of zones.

Figure 5:
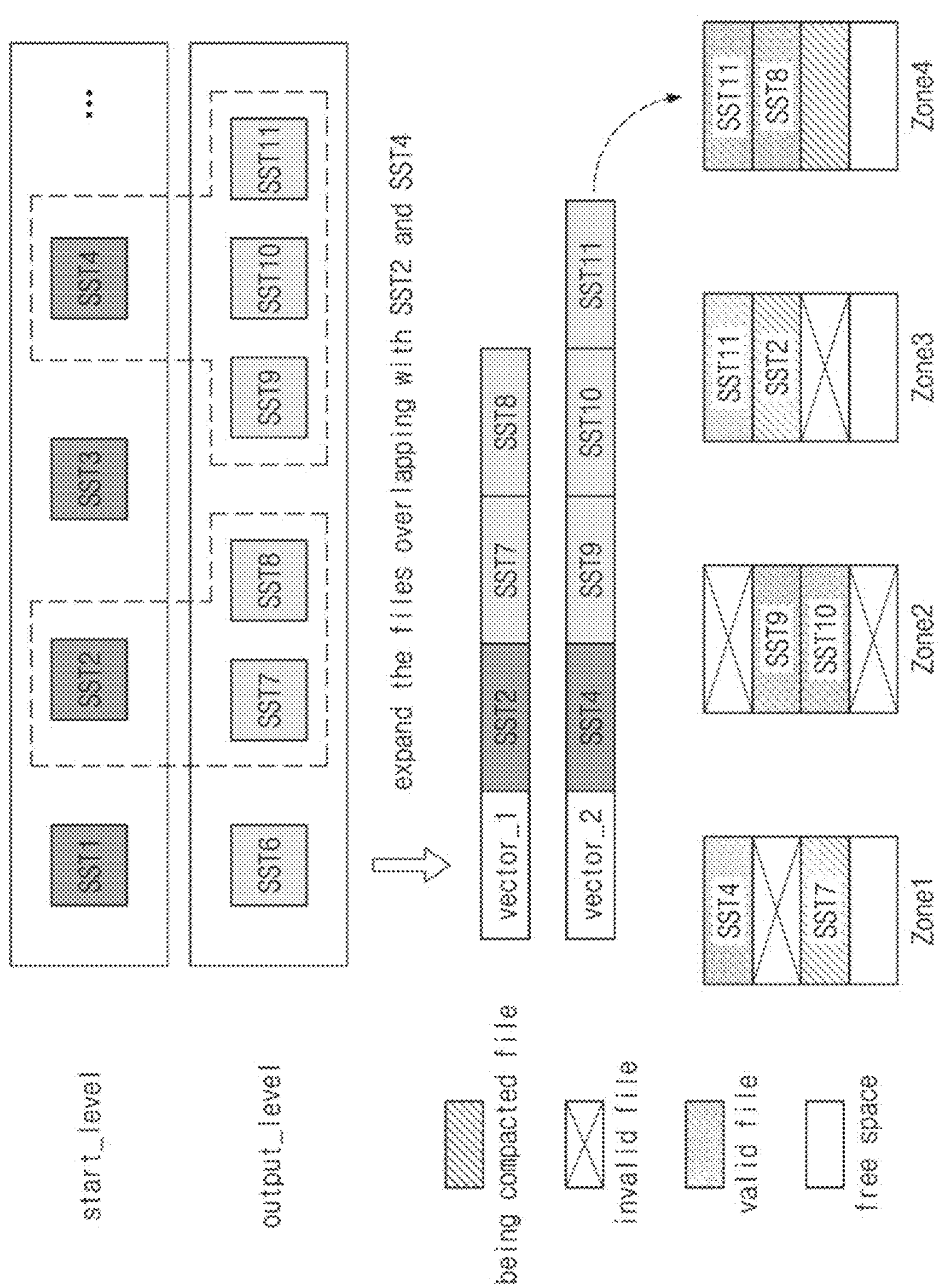
FIG. 5 is a schematic diagram illustrating compaction process according to one or more embodiments.

FIG. 5 is a schematic diagram illustrating compaction process according to one or more embodiments.

Referring to FIG. 5, a key range of each of SST files 2 and SST4 in the start level overlaps at least partially with a key range of files in the output level, SST7 and SST8 are SST files each of which has a key range overlapping at least partially with the key range of SST2 in the output level, and SST9, SST10 and SST11 are SST files each of which has a key range overlapping at least partially with the key range of SST4 in the output level.

For example, for each of SST2, SST4, SST7, SST8, SST9, SST10 and SST11, a ratio of a size of valid files in a zone corresponding to the each SST file to storage capacity of the zone corresponding to each SST file, a ratio of a size of invalid files in the zone corresponding to the each SST file to the storage capacity of the zone corresponding to the each SST file, a ratio of a number of invalid files in the zone corresponding to the each SST file to a number of all files in the zone corresponding to the each SST file, and an average value of remaining lifetimes of the valid files in the zone corresponding to the each SST file may be calculated.

Figure 6:
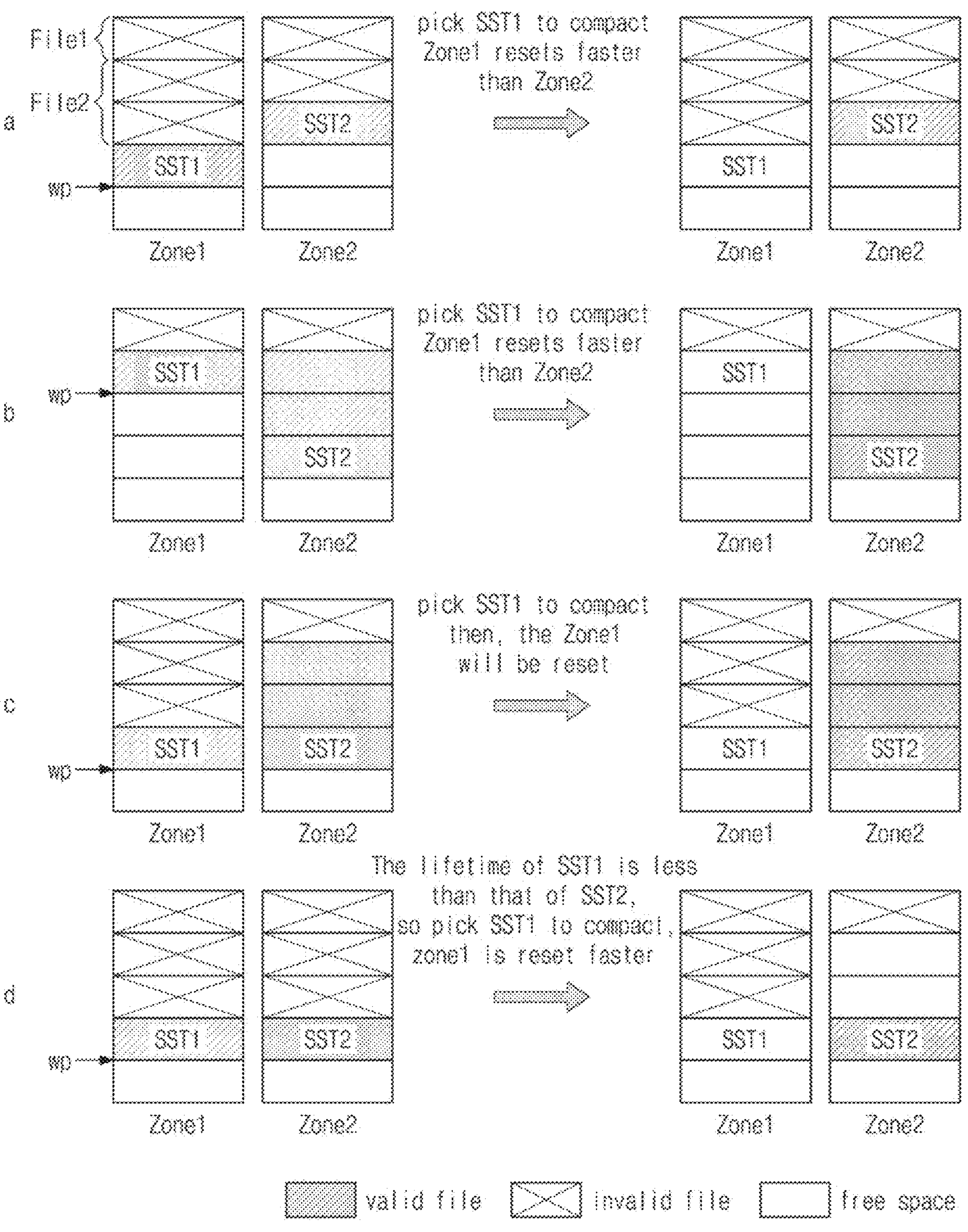
FIG. 6 is a schematic diagram illustrating an example compaction strategy according to one or more embodiments.

FIG. 6 is a schematic diagram illustrating a compaction strategy according to one or more embodiments.

Referring to FIG. 6, SST1 and SST2 are SST files in the start level that need to be compacted, and SST1 and SST2 correspond to zone 1 and zone 2, respectively.

For a case a, a ratio of a size of invalid files in zone 1 to storage capacity of zone 1 is high, and if a compaction operation is performed on SST1 first, the zone 1 may has a greater probability of being reclaimed. Thus, the compaction operation should be performed on SST1 in priority. For example, after the compaction operation is performed on SST1, SST1 becomes an invalid data fragment in zone 1, and therefore zone 1 may be reclaimed.

For a case b, the ratio of the size of the valid files in zone 1 to the storage capacity of zone 1 is small, so if the compaction operation is performed on SST1 first, it will result in more invalid files in zone 1, thereby the reclaim of zone 1 is speeded up.

For a case c, a ratio of a number of invalid files in zone 1 to a number of all files in zone 1 is great, which indicates that there are more invalid files in zone 1. If the compaction operation is performed on SST1 first, it will increase the number of the invalid files in zone 1 and thus the reclaim of zone 1 is speeded up.

For a case d, an average value of remaining lifetimes of the valid files in zone 1 is small, which indicates that the number of invalid files in zone 1 will increase faster. If the compaction of SST1 is prioritized, the reclaim of zone 1 may be accelerated. Thus, SST1 should be compacted in priority.

As an example, the determining the compaction priorities of the first plurality of SST files based on the attribute information of the second plurality of zones corresponding to each of the first plurality of SST files and the third plurality of SST files corresponding to the each SST file in the second level includes: performing weighting and summing on the ratio (hereinafter referred to as the reference factor 1) of the size of the valid files in the each of the second plurality of zones to the storage capacity of the each of the second plurality of zones, the ratio (hereinafter referred to as the reference factor 2) of the size of the invalid files in the each of the second plurality of zones to the storage capacity of the each of the second plurality of zones, the ratio (hereinafter referred to as the reference factor 3) of the number of the invalid files in the each of the second plurality of zones to the number of all files in the each of the second plurality of zones, and a normalized value (hereinafter referred to as the reference factor 4) of the average value of the remaining lifetimes of the valid files in the each of the second plurality of zones; determining a maximum value of a plurality of sums corresponding to the second plurality of zones obtained by the weighting and summing as a compaction priority value of the each of the first plurality of SST files; and determining the compaction priorities based on compaction priority values corresponding to the first plurality of SST files, wherein an SST file having a greater compaction priority value among the first plurality of SST files is determined as having a higher compaction priority.

As an example, the normalized value of the average value of the remaining lifetimes of the valid files in a zone may be obtained based on the average value of the remaining lifetimes of the valid files in the zone by using predetermined rules.

For example, a logarithmic operation (a base of the logarithmic operation may be preset) may be performed on the average value of the remaining lifetimes of the valid documents in the zone and a resultant value of the logarithmic operation is regarded as the normalized value if the resultant value is within a range (0, 1), and if the resultant value is greater than 1, 1 is regarded as the normalized value. It should be understood by those skilled in the art that other normalization methods may be used to perform normalization of the average value of the remaining lifetimes of the valid files in the zone.

As an example, weights of reference factors 1-4 may be pre-determined values, for example weights of reference factors 1-4 may be: 0.1, 0.4, 0.15 and 0.35 respectively.

For example, for SST2, reference factors 1-3 obtained by calculating with reference to FIG. 5 may be 0.5, 0.25 and 0.33 respectively, while a value of reference factor 4 may be obtained using a preset normalization method based on the average value of the remaining lifetimes of the valid files in zone 3 corresponding to SST2.

For example, if the normalized value of the average value of the remaining lifetimes of the valid documents in zone 3 is 0.5, a sum corresponding to SST2 may be obtained based on the reference factors as well as the weights as: 0.1*factor 1+0.4*factor 2+0.15*factor 3+0.35*factor 4=0.1*0.5+0.4*0.25+0.15*0.33+0.35*0.5=0.3745.

Similarly, a sum corresponding to each of SST4, SST7, SST8, SST9, SST10 and SST11 may be obtained.

Then, a maximum value of sums corresponding to SST2, SST7 and SST8 is determined as a compaction priority value of SST2, and a maximum value of sums corresponding to SST4, SST9, SST10 and SST11 is determined as a compaction priority value of SST4.

As an example, the compaction priority values of SST2 and SST4 obtained are sorted in descending order to obtain the compaction priorities of SST2 and SST4.

Referring back to FIG. 3, at operation S302, a compaction operation is performed on an SST file having a higher compaction priority among the first plurality of SST files in priority (e.g., a highest compaction priority among the first plurality of SST files).

As an example, the performing the compaction operation on an SST file having a higher compaction priority among the first plurality of SST files in priority includes: selecting the SST file with a higher compaction priority from among the first plurality of SST files; and performing the compaction operation on the selected SST file and a third plurality of SST files in the second level, wherein a key range of each of the third plurality of SST files overlaps at least partially with a key range of the selected SST.

For example, if the compaction priority of SST2 is higher than the compaction priority of SST4, the compaction operation is firstly performed on SST2, SST7 and SST8.

As an example, a file in a level participating in a compaction operation in the second plurality of zones is regarded as an invalid file, because the files in the level participating in the compaction operation will be compacted and therefore deleted from the level where the files are located.

For example, if an SST file is in a level involved in the compaction operation, it means that the SST file will soon become an invalid file, so regarding such an SST file as an invalid file may better reflect the storage space utilization rate of the zone.

For example, when calculating the reference factors corresponding to SST2, SST2 is regarded as an invalid file.

As an example, a remaining lifetime of a valid file indicates a difference between an expected expiration time of the valid file and current time, wherein the expected expiration time of the valid file is a creation time of the valid file plus a lifetime of the valid file, wherein the lifetime of the valid file is obtained by: when the valid file is created, predicting, by using a first trained machine learning model, whether a probability of the valid file participating in an active compaction operation in the future is higher than a probability of the valid file participating in an passive compaction operation in the future, based on attribute information of a level in which the valid file is located, a higher level adjacent to the level in which the valid file is located and a lower level adjacent to the level in which the valid file is located, wherein the active compaction operation indicates a compaction operation of the valid file in relation to an SST file in the higher level and the passive compaction operation indicates a compaction operation of the valid file in relation to an SST file in the lower level; when the probability of participating in the active compaction operation is higher than the probability of participating in the passive compaction operation, predicting the lifetime of the valid file based on history record files for compaction operations from the level in which the valid file is located to the higher level by using a second trained machine learning model, and when the probability of participating in the active compaction operation is not higher than the probability of participating in the passive compaction operation, predicting the lifetime of the valid file based on history record files for compaction operations from the lower level to the level in which the valid file is located, by using a third trained machine learning model, wherein each of the history record files for compaction operations from the level in which the valid file is located to the higher level, and the history record files for the compaction operations from the lower level to the level in which the valid file is located records a first key range and lifetimes of SST files deleted due to the compaction operation corresponding to the each history record file, wherein the first key range is determined based on a minimum value and a maximum value of keys of the SST files deleted due to the compaction operation.

As an example, the attribute information of the level in which the valid file is located, the higher level adjacent to the level in which the valid file is located and the lower level adjacent to the level in which the valid file is located includes: a ratio of a size of all SST files in the lower level to capacity of the lower level minus a ratio of a size of all SST files in the level in which the valid file is located to capacity of the level in which the valid file is located (hereinafter referred to as a first difference), a minimum key overlapping ratio among key overlapping ratios of respective SST files other than the valid file in the level in which the valid file is located in relation to SST files in the higher level minus a key overlapping ratio of the valid file in relation to the SST files in the higher level (hereinafter referred to as a second difference), a ratio of a size of all SST files generated by a compaction operation of generating the valid file to the capacity of the level in which the valid file is located (hereinafter referred to as a first ratio), a number of all SST files generated by the compaction operation of generating the valid file minus a number of SST files deleted due to the compaction operation of generating the valid file in the level in which the valid file is located (hereinafter referred to as a third difference), wherein the predicting the lifetime of the valid file based on the history record files for the compaction operations from the level in which the valid file is located to the higher level by using the second trained machine learning model includes: determining a second key range of the valid file and files each of which has a key range overlapping at least partially with a key range of the valid file in the higher level, selecting, from among the history record files for the compaction operations from the level in which the valid file is located to the higher level, history record files whose first key ranges are close to the second key range of the valid file and the files each of which has a key range overlapping at least partially with the key range of the valid file in the higher level according to a first predetermined rule, inputting a maximum value and a minimum value of keys of SST files deleted due to the compaction operation corresponding to the selected history record and lifetimes of the SST files recorded in the selected history record file into the second trained machine learning model to predict the lifetime of the valid file, wherein the predicting the lifetime of the valid file based on the history record files for the compaction operations from the lower level to the level in which the valid file is located, by using a third trained machine learning model comprises: determining an SST file whose key range overlaps most with the key range of the valid file in the lower level; determining a third key range of the SST file whose key range overlaps most with the key range of the valid file and SST files each of which has a key range overlapping at least partially with the key range of the SST file whose key range overlaps most with the key range of the valid file in the level in which the valid file is located, selecting, from among the history record files for the compaction operations from the lower level to the level in which the valid file is located, history record files whose first key ranges are close to the third key range, according to a second predetermined rule, inputting a maximum value and a minimum value of keys of SST files deleted due to the compaction operation corresponding to the selected history record and lifetimes of the SST files recorded in the selected history record file into the third trained machine learning model to predict the lifetime of the valid file.

As an example, the first predetermined rule includes selecting a first predetermined number of historical record files or selecting a historical record file having an overlapping ratio of the first key range to the second key range greater than a first predetermined value, from among the history record files for the compaction operations from the level in which the valid file is located to the higher level. The second predetermined rule includes selecting a second predetermined number of history record files or selecting a history record file having an overlapping ratio of the first key range to the third key range greater than a predetermined second value, from among the history record files for the compaction operations from the lower level to the level in which the valid file is located.

Figure 7:
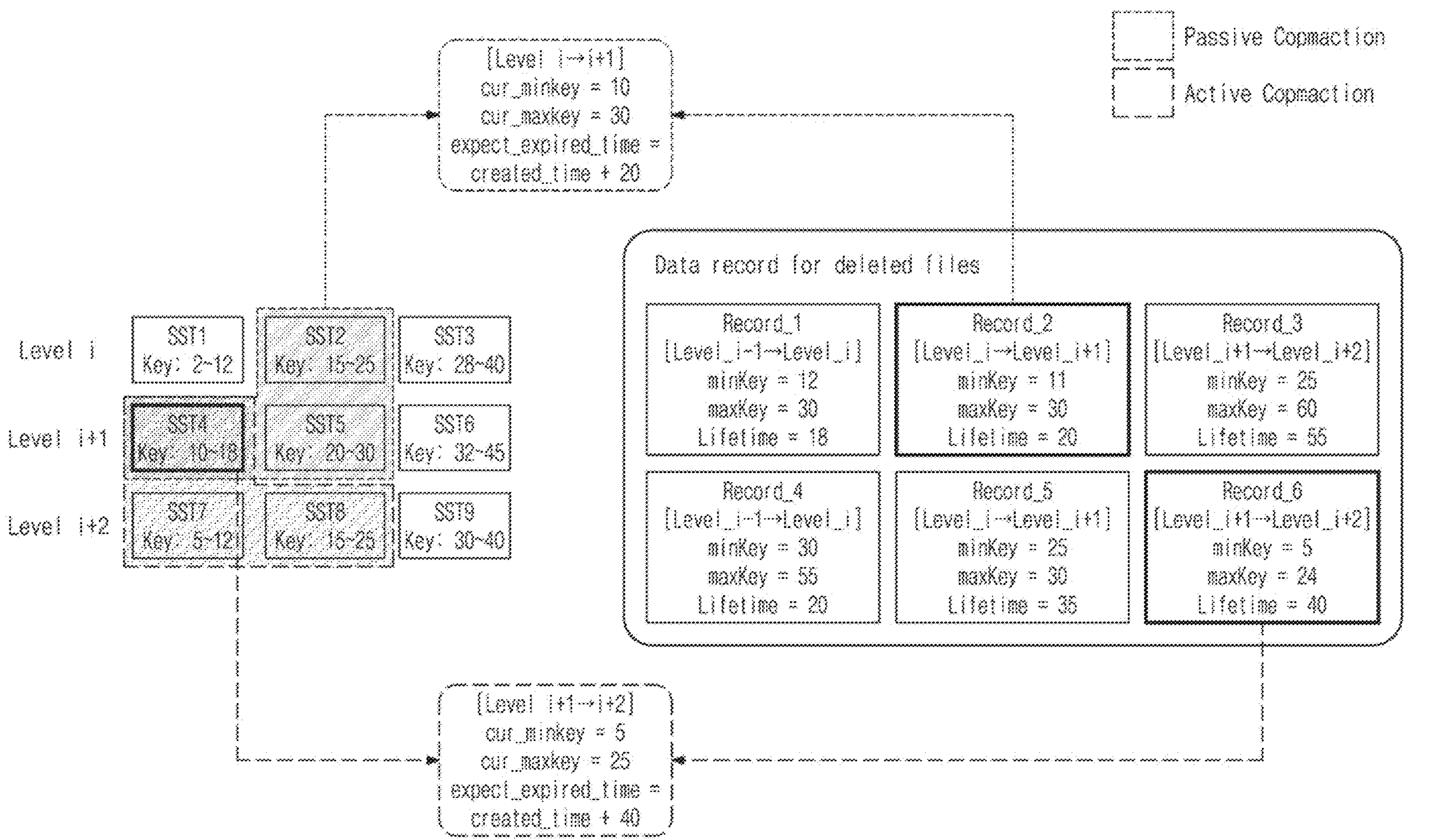
FIG. 7 is a schematic diagram illustrating predicting a lifetime of a newly generated file according to one or more embodiments.

FIG. 7 illustrates a schematic diagram of predicting a lifetime of a newly generated file according to one or more embodiments.

Referring to FIG. 7, SST4 in level i+1 is a newly generated file by a compaction operation and at this time a lifetime of SST4 needs to be predicted.

It may firstly be determined whether a probability of SST4 participating in an active compaction in the future is higher than a probability of SST4 participating in a passive compaction in the future. Specifically, a ratio of a size of all files in level i to capacity of level i is calculated, a ratio of a size of the files in level i+1 to capacity of level i+1 is calculated, and a difference (e.g., the first difference) between the ratio of the size of the files in level i to the capacity of level i and the ratio of the size of the files in level i+1 to the capacity of level i+1 is calculated. A key overlapping ratio of each SST file in level i+1 other than SST4 in relation to the files in level i+2 is calculated (e.g., a key overlapping ratio of SST5 in relation to the files in level i+2 is (30−20)/(40−15)=0.4, a key range overlapping ratio of SST6 in relation to the files in level i+2 is (40−32)/(40−30)=0.8), and a minimum value (e.g., 0.4) of the calculated key overlapping ratio is determined. A key overlapping ratio (e.g., (18−10)/(25−5)=0.4) of SST4 in relation to the files in level i+2 is calculated, and a difference between the minimum value and the key overlapping ratio of SST4 in relation to the files in level i+2 is regarded as the second difference. The compaction operation of generating SST4 may generate only SST4 or generate SST4 and other SST files, and a ratio of a number of all files generated by the compaction operation of generating SST4 to a number of all files in level i+1 is regarded as the first ratio. A difference between a number of new SST files generated by the compaction operation of generating SST4 and a number of files deleted by the compaction operation of generating SST4 is regarded as the third difference.

The first difference, the second difference, the first ratio and the third difference are input into the first trained machine learning model to determine whether the probability of SST4 participating in an active compaction in the future is higher than the probability of SST4 participating in a passive compaction in the future. For example, if an output of the first machine learning model is 1, the probability of SST4 participating in the active compaction operation is higher than the probability of SST4 participating in the passive compaction, and if the output of the first machine learning model is 2, the probability of SST4 participating in the active compaction operation is not higher than the probability of SST4 participating in the passive compaction operation.

For example, if the probability of SST4 participating in the passive compaction in the future is determined to be higher than the probability of SST4 participating in the active compaction in the future by the first machine learning model, a file whose key range overlaps most with the key range of SST4 in level i is determined to be SST2, and the SST4 and SST5 in level i+1 each of which has a key range overlapping at least partially with the key range of SST2 are determined. As can be seen that a maximum value and a minimum value of keys of SST2, SST4 and SST5 are 10 and 30 respectively, and thus the key range of SST2, SST4 and SST5 are 10-30. Record files Record_2 and Record_5 each of which has a second key range overlapping largely with the key range (e.g., 10-30) of SST2, SST4 and SST5 may be found from history record files for the compaction operation from level i to level i+1, a maximum value, a minimum value of keys of SST files deleted due to a compaction operation recorded by the Record_2 and lifetimes of the SST files, a maximum value, a minimum value of keys of SST files deleted due to a compaction operation recorded by the Record_5 and lifetimes of the SST files may be obtained, and then the maximum value, the minimum value and the lifetimes recorded by the Record_2 and the maximum value, the minimum value and the lifetimes recorded by the Record_5 may be input into the third trained machine learning model to predict the lifetime of SST4. It should be appreciated by those skilled in the art that more historical record files each of which has a second key range overlapping largely with the key range (e.g., 10-30) of SST2, SST4 and SST5 may be selected to predict the lifetime of SST4. As an example, a historical record file with key range of which overlapping ratio to the key range of SST2, SST4 and SST5 is greater than a set value may be selected to predict the lifetime of the SST4.

For example, if the probability of SST4 participating in the active compaction in the future is determined to not be higher than the probability of SST4 participating in the passive compaction in the future by the first machine learning model, SST files SST7 and SST8 each of which has a key range overlapping at least partially with the key range of SST4 in level i+2 are determined. As can be seen that a maximum value and a minimum value of keys of SST4, SST7 and SST8 are 25 and 5 respectively, and thus the key range of SST4, SST7 and SST8 are 5-25. A Record file Record_6 which has a second key range overlapping largely with the key range (e.g., 5-25) of SST4, SST7 and SST8 may be found from history record files for the compaction operation from level i+1 to level i+2, a maximum value, a minimum value of keys of SST files deleted due to a compaction operation recorded by the Record_6 and lifetimes of the SST files, may be obtained, and then the maximum value, the minimum value and the lifetimes recorded by the Record_6 may be input into the second trained machine learning model to predict the lifetime of SST4. It should be appreciated by those skilled in the art that more historical record files each of which has a second key range overlapping largely with the key range (e.g., 10-30) of SST4, SST7 and SST8 may be selected to predict the lifetime of SST4. As an example, a historical record file with a key range of which overlapping ratio to the key range of SST4, SST7 and SST8 is greater than a set value may be selected to predict the lifetime of the SST4.

It should be understood by those skilled in the art that the type of data used to train the machine model described above is the same type of data used to make predictions using the machine learning model that has been trained.

Figure 8:
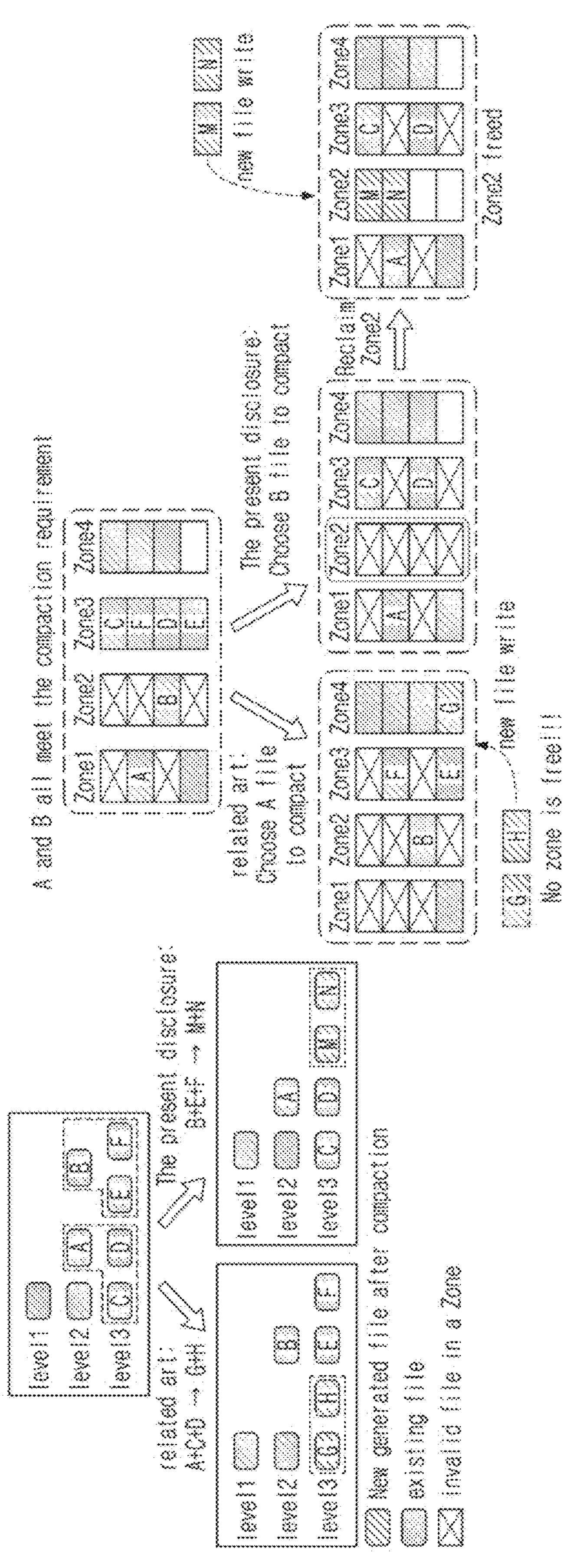
FIG. 8 is a schematic diagram illustrating a compaction strategy in the related art and a compaction strategy according to one or more embodiments.

FIG. 8 is a schematic diagram illustrating an example compaction strategy in the related art and a compaction strategy according to one or more embodiments.

Referring to FIG. 8, files A and B are both files to be compacted in level 2, wherein the key ranges of files C and D overlap at least partially with a key range of file A, and the key ranges of files E and F overlap at least partially with the key range of file B.

According to the compaction strategy in the relevant technology, a compaction is firstly performed on file A, e.g., the compaction is performed on files A, C and D. After the compaction operation, file A in level 2 and files C and D in level 3 are deleted and new files G and H are generated. In addition, file A in zone 1 and files C and D in zone 3 become invalid, and files G and H are stored in free space of a zone of the ZNS SSD. However, after storing G in the free space, there is no free space for storing H. Therefore, the writing for file H fails. Furthermore, referring to FIG. 8, it can be seen that there are more invalid files in zone 1 and zone 2. However, since there are a small number of valid files in zone 1 and zone 2, zone 1 and zone 2 cannot be reclaimed to provide free space for file H.

According to the compaction strategy of the present disclosure, files B, E and F are compacted first. After the compaction, file B in level 2 and files E and F in level 3 are deleted and files M and N in level 3 are generated. Accordingly, file B in zone 2 and files E and F in zone 3 become invalid files and files M and N need to be stored in the free space of the ZNS SSD.

Since all files in zone 2 are invalid after the compaction operation, zone 2 may be reclaimed and then files E and F are stored in zone 2. When a compaction is performed on file A, the newly generated files may be stored in free space of zone 2 as well as in the free space of zone 4.

As described above, the compaction strategy according to the present disclosure improves the storage space utilization rate of the ZNS SSD.

The compaction method for SST files according to one or more embodiments of the present disclosure are described above with reference to FIGS. 1 to 8, and a compaction method for SST files, an electronic device, a storage device, and a system according to one or more embodiments of the present disclosure are described below with reference to FIGS. 9 to 14.

Figure 9:
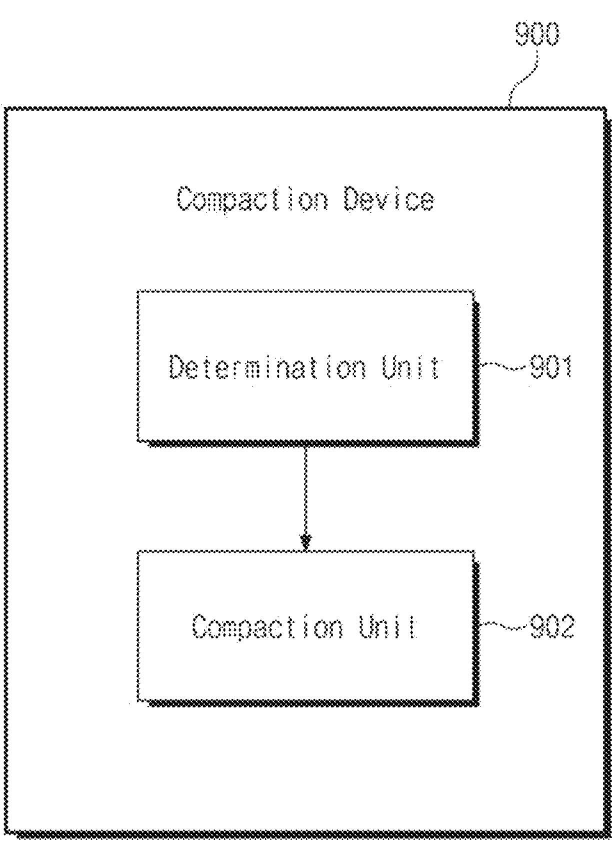
FIG. 9 illustrates a block diagram of a structure of a compaction device for SST files according to one or more embodiments.

FIG. 9 illustrates a block diagram of a structure of a compaction device for SST files according to one or more embodiments.

Referring to FIG. 9, the compaction device 900 may include a determination unit 901 and a compaction unit 902. It should be understood by those skilled in the art that the compaction device 900 may additionally include other components, and that at least one of the components included in the compaction device 900 may be combined or divided. The determination unit 901 and the compaction unit 902 may be embodied as one or more memories storing instructions and one or more processors configure to execute the instructions.

As an example, an SST file described herein may be stored in a zone of a ZNS SSD.

As an example, the determination unit 901 may be configured to, in response to determining that a compaction operation needs to be performed on a first level of a Log Structure Merge Tree (LSM-Tree), determine compaction priorities of a first plurality of SST files in the first level based on attribute information of a first plurality of zones corresponding to the first plurality of SST files and a second plurality of SST files in a second level, wherein a key range of each of the first plurality of SST files overlaps at least partially with key ranges of SST files in the second level, and a key range of each of the second plurality of SST files overlaps at least partially with key ranges of the first plurality of SST files, wherein the second level indicates a level of the LSM-Tree that is adjacent to the first level and higher than the first level.

As an example, the attribute information of the first plurality of zones includes at least one of a size of valid files in each of the first plurality of zones, a size of invalid files in the each of the first plurality of zones, a number of the invalid files in the each of the first plurality of zones, and expected expiration times of the valid files in the each of the first plurality of zones.

As an example, the determination unit 901 may be configured to: determine the compaction priorities of the first plurality of SST files based on attribute information of a second plurality of zones corresponding to each of the first plurality of SST files and a third plurality of SST files corresponding to the each SST file in the second level, wherein a key range of each of the third plurality of SST files overlaps at least partially with a key range of the each SST file, and wherein the attribute information of the second plurality of zones corresponding to the each of the first plurality of SST files and the third plurality of SST files includes: a ratio of a size of valid files in each of the second plurality of zones to storage capacity of the each of the second plurality of zones, a ratio of a size of invalid files in the each of the second plurality of zones to the storage capacity of the each of the second plurality of zones, a ratio of a number of the invalid files in the each of the second plurality of zones to a number of all files in the each of the second plurality of zones, and an average value of remaining lifetimes of the valid files in the each of the second plurality of zones.

As an example, the determination unit 901 may be configured to: perform weighting and summing on the ratio of the size of the valid files in the each of the second plurality of zones to the storage capacity of the each of the second plurality of zones, the ratio of the size of the invalid files in the each of the second plurality of zones to the storage capacity of the each of the second plurality of zones, the ratio of the number of the invalid files in the each of the second plurality of zones to the number of all files in the each of the second plurality of zones, and a normalized value of the average value of the remaining lifetimes of the valid files in the each of the second plurality of zones; determine a maximum value of a plurality of sums corresponding to the second plurality of zones obtained by the weighting and summing as a compaction priority value of the each of the first plurality of SST files; and determine the compaction priorities based on compaction priority values corresponding to the first plurality of SST files, wherein an SST file having a greater compaction priority value among the first plurality of SST files is determined as having a higher compaction priority.

As an example, the compaction unit 902 may be configured to perform the compaction operation on an SST file having a higher compaction priority among the first plurality of SST files in priority.

As an example, the compaction unit may be configured to: select the SST file with a higher compaction priority from among the first plurality of SST files; and perform the compaction operation on the selected SST file and a third plurality of SST files in the second level, wherein a key range of each of the third plurality of SST files overlaps at least partially with a key range of the selected SST.

As an example, a file that is in a level involved in the compaction operation in the second plurality of zones is regarded as an invalid file.

As an example, the LSM-Tree is based on a LevelDB or a RocksDB.

As an example, a remaining lifetime of a valid file indicates a difference between an expected expiration time of the valid file and current time, wherein the expected expiration time of the valid file is a creation time of the valid file plus a lifetime of the valid file, and the lifetime of the valid file is obtained by: when the valid file is created, predicting, by using a first trained machine learning model, whether a probability of the valid file participating in an active compaction operation in the future is higher than a probability of the valid file participating in an passive compaction operation passive, based on attribute information of a level in which the valid file is located, a higher level adjacent to the level in which the valid file is located and a lower level adjacent to the level in which the valid file is located, wherein the active compaction operation indicates a compaction operation of the valid file in relation to an SST file in the higher level and the passive compaction operation indicates a compaction operation of the valid file in relation to an SST file in the lower level; when the probability of participating in the active compaction operation is higher than the probability of participating in the passive compaction operation passive, predicting the lifetime of the valid file based on history record files for compaction operations from the level in which the valid file is located to the higher level by using a second trained machine learning model, and when the probability of participating in the active compaction operation is not higher than the probability of participating in the passive compaction operation passive, predicting the lifetime of the valid file based on history record files for compaction operations from the lower level to the level in which the valid file is located, by using a third trained machine learning model, wherein each of the history record files for compaction operations from the level in which the valid file is located to the higher level and the history record files for the compaction operations from the lower level to the level in which the valid file is located records a first key range and lifetimes of SST files deleted due to the compaction operation corresponding to the each history record file, wherein the first key range is determined based on a minimum value and a maximum value of keys of the SST files deleted due to the compaction operation.

As an example, the attribute information of the level in which the valid file is located, the higher level adjacent to the level in which the valid file is located and the lower level adjacent to the level in which the valid file is located includes: a ratio of a size of all SST files in the lower level to capacity of the lower level minus a ratio of a size of all SST files in the level in which the valid file is located to capacity of the level in which the valid file is located, a minimum key overlapping ratio among key overlapping ratios of respective SST files other than the valid file in the level in which the valid file is located in relation to SST files in the higher level minus a key overlapping ratio of the valid file in relation to the SST files in the higher level, a ratio of a size of all SST files generated by a compaction operation of generating the valid file to the capacity of the level in which the valid file is located, a number of all SST files generated by the compaction operation of generating the valid file minus a number of SST files deleted due to the compaction operation of generating the valid file in the level in which the valid file is located, wherein the predicting the lifetime of the valid file based on the history record files for the compaction operations from the level in which the valid file is located to the higher level by using the second trained machine learning model includes: determining a second key range of the valid file and files each of which has a key range overlapping at least partially with a key range of the valid file in the higher level, selecting, from among the history record files for the compaction operations from the level in which the valid file is located to the higher level, history record files whose first key ranges are close to the second key range according to a first predetermined rule, inputting a maximum value and a minimum value of keys of SST files deleted due to the compaction operation corresponding to the selected history record and lifetimes of the SST files recorded in the selected history record file into the second trained machine learning model to predict the lifetime of the valid file, wherein the predicting the lifetime of the valid file based on the history record files for the compaction operations from the lower level to the level in which the valid file is located, by using a third trained machine learning model comprises: determining an SST file of the lower level whose key range overlaps most with the key range of the valid file; determining a third key range of the SST file whose key range overlaps most with the key range of the valid file and SST files each of which has a key range overlapping at least partially with the key range of the SST file whose key range overlaps most with the key range of the valid file in the level in which the valid file is located, selecting, from among the history record files for the compaction operations from the lower level to the level in which the valid file is located, history record files whose first key ranges are close to the third key range, according to a second predetermined rule, inputting a maximum value and a minimum value of keys of SST files deleted due to the compaction operation corresponding to the selected history record and lifetimes of the SST files recorded in the selected history record file into the third trained machine learning model to predict the lifetime of the valid file.

As an example, the first predetermined rule includes selecting a first predetermined number of historical record files or selecting a historical record file having an overlapping ratio of the first key range to the second key range greater than a first predetermined value, from among the history record files for the compaction operations from the level in which the valid file is located to the higher level, and the second predetermined rule includes selecting a second predetermined number of history record files or selecting a history record file having an overlapping ratio of the first key range to the third key range greater than a predetermined second value, from among the history record files for the compaction operations from the lower level to the level in which the valid file is located.

According to another aspect of one or more embodiments of the present disclosure, there is provided a computer readable storage medium storing a computer program that when executed by a processor causes the processor to implement the compaction method for SST files performed by the electronic device as described above and causes a storage device connected to the processor to implement the data compaction performed by the storage device as described above method.

FIG. 10 is a schematic diagram of a system 1000 according to one or more embodiments.

The system 1000 of FIG. 10 may basically be a mobile system, such as a portable communication terminal (e.g., a mobile phone), a smartphone, a tablet personal computer (PC), a wearable device, a healthcare device, or an Internet of things (IoT) device. However, the system 1000 of FIG. 10 is not necessarily limited to the mobile system and may be a PC, a laptop computer, a server, a media player, or an automotive device (e.g., a navigation device).

Referring to FIG. 10, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, stage-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVM (Non-Volatile Memory)s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 1000 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to one or more embodiments, there is provided an electronic device, including: a memory (e.g., memories 1200*a* and 1200*b* of FIG. 10) storing one or more instructions; and storage devices (e.g., storage devices 1300*a* and 1300*b* of FIG. 10); and a main processor (e.g., main processor 1100 of FIG. 10) configured to execute the one or more instructions to cause the main processor to perform the compaction method for SST files as described herein.

Figure 11:
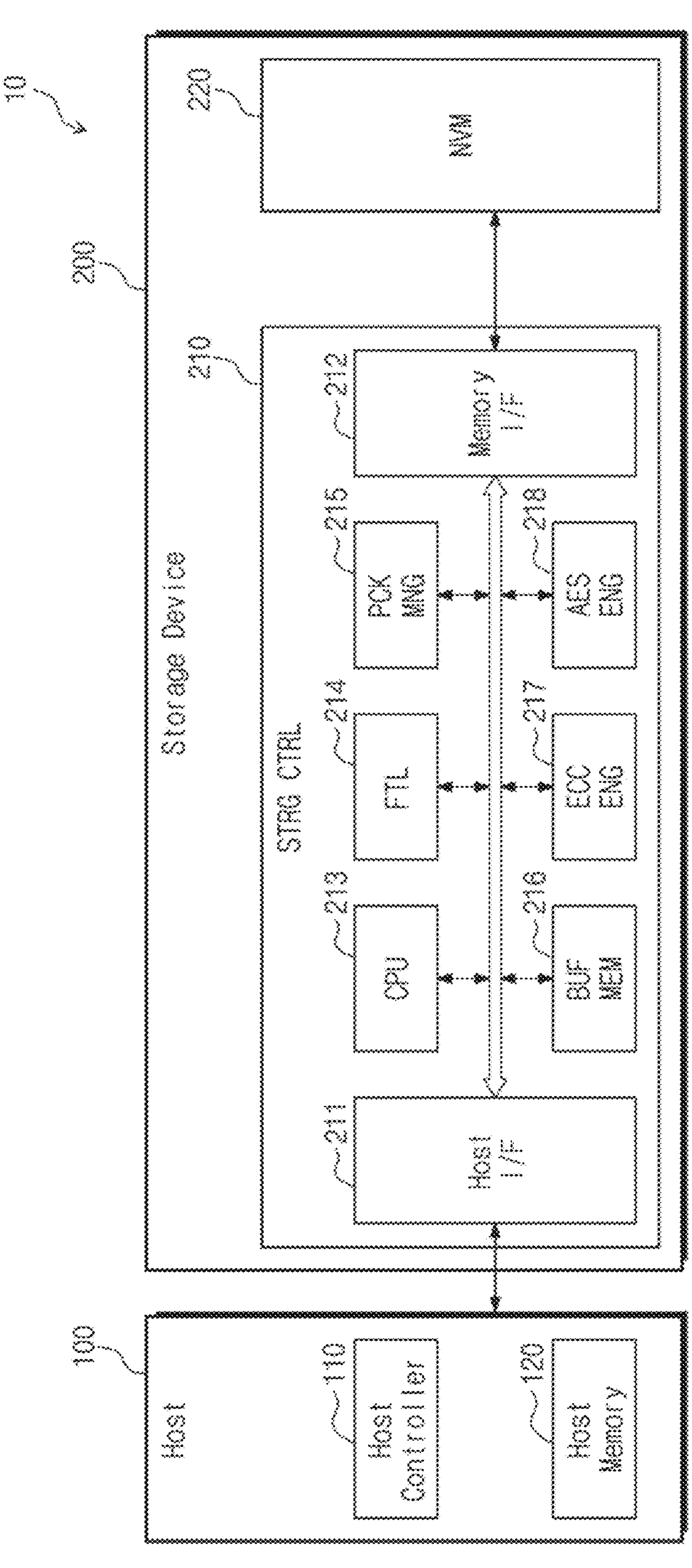
FIG. 11 is a block diagram of a host storage system according to one or more embodiments.

FIG. 11 is a block diagram of a host storage system 10 according to one or more embodiments.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

According to one or more embodiments, a host storage system is provided, including: a host (e.g., host 100 of FIG. 11) including a host memory (e.g., host memory 120 of FIG. 11) and a host controller (e.g., host controller 110 of FIG. 11); and a storage device (e.g., storage device 200 of FIG. 11), wherein the host memory stores instructions that when executed by the host controller cause the host controller to perform the compaction method for SST files as described herein.

Figure 12:
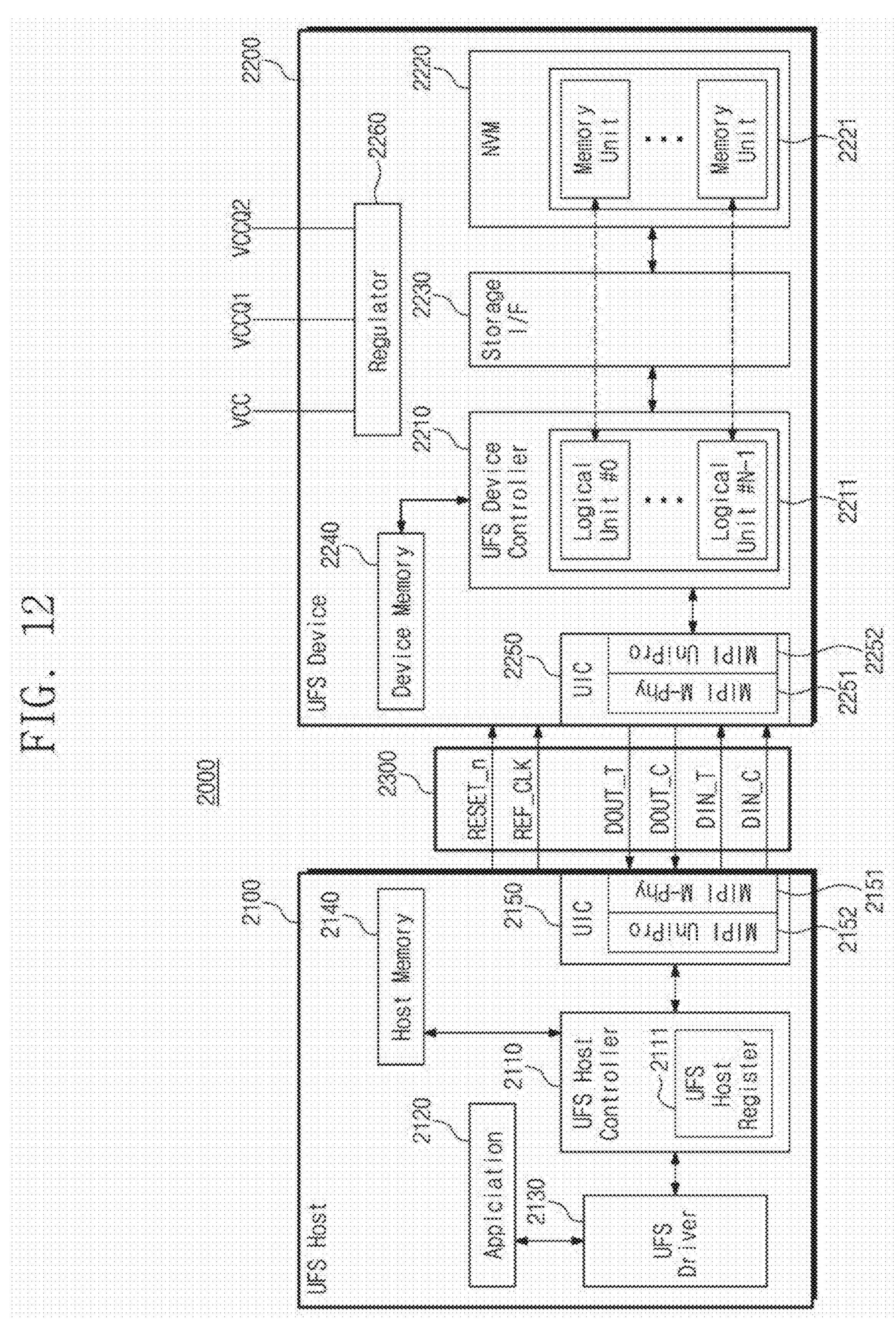
FIG. 12 is a block diagram of a Universal Flash Storage (UFS) system according to one or more embodiments.

FIG. 12 is a block diagram of a UFS system 2000 according to one or more embodiments.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 10 may also be applied to the UFS system 2000 of FIG. 12 within a range that does not conflict with the following description of FIG. 12.

Referring to FIG. 12, the UFS host 2100 may be connected to the UFS device 2200 through the UFS interface 2300. When the main processor 1100 of FIG. 10 is an AP, the UFS host 2100 may be implemented as a portion of the AP. The UFS host controller 2110 and the host memory 2140 may respectively correspond to the controller 1120 of the main processor 1100 and the memories 1200*a* and 1200*b* of FIG. 10. The UFS device 2200 may correspond to the storage device 1300*a* and 1300*b* of FIG. 10, and a UFS device controller 2210 and an NVM 2220 may respectively correspond to the storage controllers 1310*a* and 1310*b* and the NVMs 1320*a* and 1320*b* of FIG. 10.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 12, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 12, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

According to one or more embodiments, there is provided a UFS system, including: a UFS host (e.g., UFS host 2100 of FIG. 12) configured to perform the compaction method for SST files as described herein; a UFS device (e.g., UFS device 2200 of FIG. 12); and a UFS interface (e.g., UFS interface 2300 of FIG. 12), used for a communication between the UFS device and the UFS host.

FIG. 13 is a block diagram of a memory system 15 according to one or more embodiments. Referring to FIG.

13, the memory system 15 may include a memory device 17 and a memory controller 16. The memory system 15 may support a plurality of channels CH1 to CHm, and the memory device 17 may be connected to the memory controller 16 through the plurality of channels CH1 to CHm. For example, the memory system 15 may be implemented as a storage device, such as an SSD.

The memory device 17 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1*n* may be connected to a first channel CH1 through ways W11 to W1*n*, and the NVM devices NVM21 to NVM2*n* may be connected to a second channel CH2 through ways W21 to W2*n*. In an example embodiment, each of the NVM devices NVM11 to NVMmn may be implemented as an arbitrary memory unit that may operate according to an individual command from the memory controller 16. For example, each of the NVM devices NVM11 to NVMmn may be implemented as a chip or a die, but the inventive concept is not limited thereto.

The memory controller 16 may transmit and receive signals to and from the memory device 17 through the plurality of channels CH1 to CHm. For example, the memory controller 16 may transmit commands CMDa to CMDm, addresses ADDRa to ADDRm, and data DATAa to DATAm to the memory device 17 through the channels CH1 to CHm or receive the data DATAa to DATAm from the memory device 17.

The memory controller 16 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 16 may select the NVM device NVM11 from the NVM devices NVM11 to NVM1*n* connected to the first channel CH1. The memory controller 16 may transmit the command CMDa, the address ADDRa, and the data DATAa to the selected NVM device NVM11 through the first channel CH1 or receive the data DATAa from the selected NVM device NVM11.

The memory controller 16 may transmit and receive signals to and from the memory device 17 in parallel through different channels. For example, the memory controller 16 may transmit a command CMDb to the memory device 17 through the second channel CH2 while transmitting a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control all operations of the memory device 17. The memory controller 16 may transmit a signal to the channels CH1 to CHm and control each of the NVM devices NVM11 to NVMmn connected to the channels CH1 to CHm. For instance, the memory controller 16 may transmit the command CMDa and the address ADDRa to the first channel CH1 and control one selected from the NVM devices NVM11 to NVM1*n*.

Each of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 16.

Although FIG. 13 illustrates an example in which the memory device 17 communicates with the memory controller 16 through m channels and includes n NVM devices corresponding to each of the channels, the number of channels and the number of NVM devices connected to one channel may be variously changed.

According to one or more embodiments, there is provided a storage system including: a memory device (e.g., memory device 17); and a memory controller (e.g., memory controller 16) configured to perform the compaction method for SST files as described herein.

Figure 14:
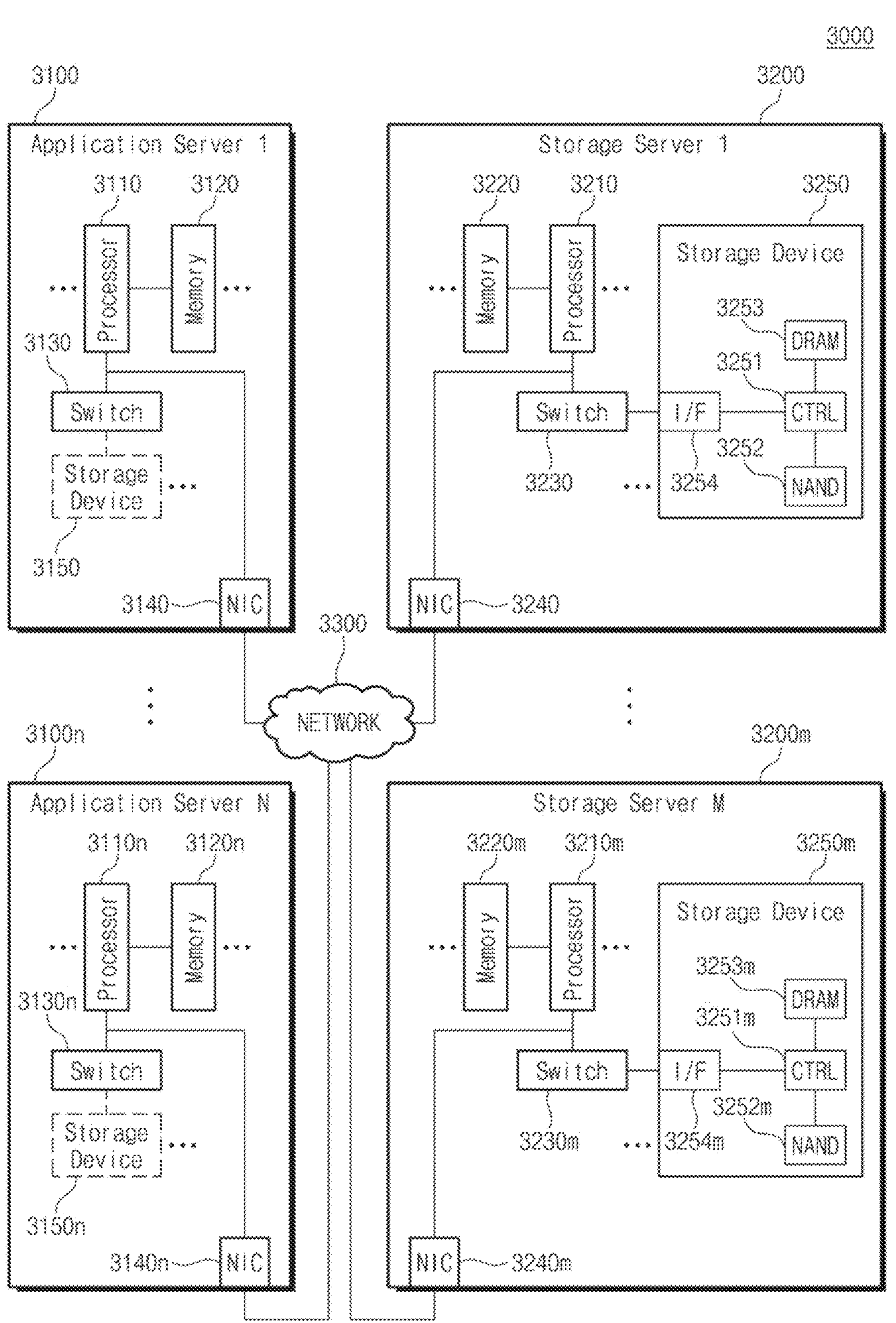
FIG. 14 is a schematic diagram of a data center to which storage devices are applied according to one or more embodiments.

FIG. 14 is a diagram of a data center 3000 to which a storage device is applied according to one or more embodiments.

Referring to FIG. 14, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100*n* and storage servers 3200 to 3200*m*. The number of application servers 3100 to 3100*n* and the number of storage servers 3200 to 3200*m* may be variously selected according to embodiments. The number of application servers 3100 to 3100*n* may be different from the number of storage servers 3200 to 3200*m*.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100*n* may communicate with the storage servers 3200 to 3200*m* through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200*m* may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

According to an embodiment of the present disclosure, there is provided a data center system (for example, data center 3000), including: a plurality of application servers (for example, application servers 3100-3100*n*); and a plurality of storage servers (for example, storage servers 3200-3200*m*), wherein each of plurality of application servers and/or the plurality of storage servers is configured to perform the compaction method for SST files as described herein.

According to an embodiment of the present disclosure, there may be provided a computer-readable storage medium storing instructions, when executed by at least one processor, causing the at least one processor to perform the compaction method for SST files according to the present disclosure. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD- RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

According to an embodiment of the present disclosure, there may be provided a computer program product, wherein instructions in the computer program product may be executed by a processor of a computer device to implement the compaction method for SST files described herein.

Those skilled in the art will easily think of other embodiments of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as exemplary only, and the actual scope and spirit of the present disclosure are pointed out by the following claims.

What is claimed is:

1. A compaction method for Sorted String Table (SST) files stored in zones of a Zoned Namespace (ZNS) Solid State Drive (SSD), the compaction method comprising:

determining compaction priorities of a first plurality of SST files in a first level of a Log Structure Merge Tree (LSM-Tree) based on attribute information of a first plurality of zones corresponding to the first plurality of SST files and a second plurality of SST files in a second level of the LSM-Tree, wherein the second level is adjacent to the first level and higher than the first level, a key range of each of the first plurality of SST files overlaps at least part of key ranges of SST files in the second level, and a key range of each of the second plurality of SST files overlaps at least part of key ranges of the first plurality of SST files; and performing a compaction operation on an SST file having a highest compaction priority among the first plurality of SST files by deleting the SST file in the respective zone and reclaiming the respective zone for storing a new SST file, wherein the attribute information of the first plurality of zones includes at least one of a size of valid files in each of the first plurality of zones, a size of invalid files in the each of the first plurality of zones, a number of the invalid files in the each of the first plurality of zones, and expected expiration times of the valid files in the each of the first plurality of zones, and wherein the determining the compaction priorities of the first plurality of SST files comprises:

performing weighting and summing attribute information of a second plurality of zones corresponding to each of the first plurality of SST files and a third plurality of SST files in the second level that overlap with the each of the first plurality of SST files.

2. The compaction method of claim 1, wherein the performing the compaction operation on the SST file having the highest compaction priority among the first plurality of SST files comprises:

selecting the SST file with the highest compaction priority from among the first plurality of SST files; and performing the compaction operation on the selected SST file and a third plurality of SST files in the second level, wherein a key range of each of the third plurality of SST files overlaps at least part of a key range of the selected SST file.

3. The compaction method of claim 1, wherein the determining the compaction priorities of the first plurality of SST files comprises:

wherein a key range of each of the third plurality of SST files overlaps at least part of a key range of each of the first plurality of SST files, and wherein the attribute information of the second plurality of zones comprises:

a ratio of a size of valid files in each of the second plurality of zones to a storage capacity of the each of the second plurality of zones, a ratio of a size of invalid files in the each of the second plurality of zones to the storage capacity of the each of the second plurality of zones, a ratio of a number of the invalid files in the each of the second plurality of zones to a number of all files in each of the second plurality of zones, and an average value of remaining lifetimes of the valid files in the each of the second plurality of zones.

4. The compaction method of claim 3, wherein the determining the compaction priorities of the first plurality of SST files based on the attribute information of the second plurality of zones comprises:

performing the weighting and the summing on the ratio of the size of the files in the each of the second plurality of zones to the storage capacity of the each of the second plurality of zones, the ratio of the size of the invalid files in the each of the second plurality of zones to the storage capacity of the each of the second plurality of zones, the ratio of the number of the invalid files in the each of the second plurality of zones to the number of all files in the each of the second plurality of zones, and a normalized value of the average value of the remaining lifetimes of the valid files in the each of the second plurality of zones;

determining a maximum value among a plurality of sums corresponding to the second plurality of zones as a compaction priority value of each of the first plurality of SST files; and determining the compaction priorities of the first plurality of SST files based on at least one compaction priority value corresponding to the first plurality of SST files, wherein an SST file having a greatest compaction priority value among the first plurality of SST files is determined as having the highest compaction priority, among the compaction priorities.

5. The compaction method of claim 3, wherein a file that is in a level involved in a compaction operation in the second plurality of zones is regarded as an invalid file.

6. The compaction method of claim 3, wherein a remaining lifetime of a valid file indicates a difference between an expected expiration time of the valid file and a current time, and the expected expiration time of the valid file is a creation time of the valid file plus a lifetime of the valid file, wherein the lifetime of the valid file is obtained by:

when the valid file is created, predicting, by using a first trained machine learning model, whether a probability of the valid file participating in an active compaction operation in the future is higher than a probability of the valid file participating in an passive compaction operation in the future, based on attribute information of a level in which the valid file is located, a higher level adjacent to the level in which the valid file is located and a lower level adjacent to the level in which the valid file is located, wherein the active compaction operation indicates a compaction operation of the valid file in relation to an SST file in the higher level and the passive compaction operation indicates a compaction operation of the valid file in relation to an SST file in the lower level, based on the probability of participating in the active compaction operation being higher than the probability of participating in the passive compaction operation, predicting the lifetime of the valid file based on history record files for compaction operations from the level in which the valid file is located to the higher level, by using a second trained machine learning model, based on the probability of participating in the active compaction operation not being higher than the probability of participating in the passive compaction operation, predicting the lifetime of the valid file based on history record files for compaction operations from the lower level to the level in which the valid file is located, by using a third trained machine learning model, wherein each of the history record files for the compaction operations from the level in which the valid file is located to the higher level and the history record files for the compaction operations from the lower level to the level in which the valid file is located records a first key range and lifetimes of SST files deleted due to the compaction operation corresponding to the each history record file, and wherein the first key range is determined based on a minimum value and a maximum value of keys of the SST files deleted due to the compaction operation.

7. The compaction method of claim 6, wherein the attribute information of the level in which the valid file is located, the higher level adjacent to the level in which the valid file is located and the lower level adjacent to the level in which the valid file is located comprises:

a ratio of a size of all SST files in the lower level to capacity of the lower level minus a ratio of a size of all SST files in the level in which the valid file is located to capacity of the level in which the valid file is located, a minimum key overlapping ratio among key overlapping ratios of respective SST files other than the valid file in the level in which the valid file is located in relation to SST files in the higher level minus a key overlapping ratio of the valid file in relation to the SST files in the higher level, a ratio of a size of all SST files generated by a compaction operation of generating the valid file to the capacity of the level in which the valid file is located, and a number of all SST files generated by the compaction operation of generating the valid file minus a number of SST files deleted due to the compaction operation of generating the valid file in the level in which the valid file is located, wherein the predicting the lifetime of the valid file based on the history record files for the compaction operations from the level in which the valid file is located to the higher level by using the second trained machine learning model comprises:

determining a second key range of the valid file and files each of which has a key range overlapping at least part of a key range of the valid file in the higher level, selecting, from among the history record files for the compaction operations from the level in which the valid file is located to the higher level, history record files whose first key ranges are close to the second key range according to a first predetermined rule, and inputting a maximum value and a minimum value of keys of SST files deleted due to the compaction operation corresponding to the selected history record file and lifetimes of the SST files recorded in the selected history record file into the second trained machine learning model to predict the lifetime of the valid file, wherein the predicting the lifetime of the valid file based on the history record files for the compaction operations from the lower level to the level in which the valid file is located, by using the third trained machine learning model comprises:

determining an SST file whose key range overlaps most with the key range of the valid file in the lower level, determining a third key range of the SST file whose key range overlaps most with the key range of the valid file and SST files each of which has a key range overlapping at least part of the key range of the SST file whose key range overlaps most with the key range of the valid file in the level in which the valid file is located, selecting, from among the history record files for the compaction operations from the lower level to the level in which the valid file is located, history record files whose first key ranges are close to the third key range, according to a second predetermined rule, and inputting a maximum value and a minimum value of keys of SST files deleted due to the compaction operation corresponding to the selected history record file and lifetimes of the SST files recorded in the selected history record file into the third trained machine learning model to predict the lifetime of the valid file.

8. The compaction method of claim 7, wherein the first predetermined rule comprises selecting a first predetermined number of historical record files, or selecting a historical record file having an overlapping ratio of the first key range to the second key range greater than a first predetermined value, from among the history record files for the compaction operations from the level in which the valid file is located to the higher level, and wherein the second predetermined rule comprises selecting a second predetermined number of history record files, or selecting a history record file having an overlapping ratio of the first key range to the third key range greater than a predetermined second value, from among the history record files for the compaction operations from the lower level to the level in which the valid file is located.

9. The compaction method of claim 1, wherein the LSM-Tree is based on a LevelDB or a RocksDB.

10. A compaction device for Sorted String Table (SST) files stored in zones of a Zoned Namespace (ZNS) Solid State Drive (SSD), the compaction device comprising:

a memory storing instructions;

one or more processors configured to execute the instructions to:

determine compaction priorities of a first plurality of SST files in a first level of a Log Structure Merge Tree (LSM-Tree) based on attribute information of a first plurality of zones corresponding to the first plurality of SST files and a second plurality of SST files in a second level of the LSM-Tree, wherein the second level is adjacent to the first level and higher than the first level, a key range of each of the first plurality of SST files overlaps at least part of key ranges of SST files in the second level, and a key range of each of the second plurality of SST files overlaps at least part of key ranges of the first plurality of SST files; and perform a compaction operation on an SST file having a highest compaction priority among the first plurality of SST files by deleting the SST file in the respective zone and reclaiming the respective zone for storing a new SST file, wherein the attribute information of the first plurality of zones includes at least one of a size of valid files in each of the first plurality of zones, a size of invalid files in the each of the first plurality of zones, a number of the invalid files in the each of the first plurality of zones, and expected expiration times of the valid files in the each of the first plurality of zones, and wherein the one or more processors are configured to execute the instructions to determine the compaction priorities of the first plurality of SST files by performing weighting and summing attribute information of a second plurality of zones corresponding to each of the first plurality of SST files and a third plurality of SST files in the second level that overlap with the each of the first plurality of SST files.

11. The compaction device of claim 10, wherein the one or more processors is further configured to execute the instructions to:

select the SST file with the highest compaction priority from among the first plurality of SST files; and perform the compaction operation on the selected SST file and a third plurality of SST files in the second level, wherein a key range of each of the third plurality of SST files overlaps at least part of a key range of the selected SST file.

12. The compaction device of claim 10, wherein a key range of each of the third plurality of SST files overlaps at least part of a key range of each of the first plurality of SST files, and wherein the attribute information of the second plurality of zones comprises:

a ratio of a size of valid files in each of the second plurality of zones to a storage capacity of the each of the second plurality of zones, a ratio of a size of invalid files in the each of the second plurality of zones to the storage capacity of the each of the second plurality of zones, a ratio of a number of the invalid files in the each of the second plurality of zones to a number of all files in each of the second plurality of zones, and an average value of remaining lifetimes of the valid files in the each of the second plurality of zones.

13. The compaction device of claim 12, wherein the one or more processors is further configured to execute the instructions to:

perform the weighting and the summing of the attribute information of the second plurality of zones by performing weighting and summing on the ratio of the size of the files in the each of the second plurality of zones to the storage capacity of the each of the second plurality of zones, the ratio of the size of the invalid files in the each of the second plurality of zones to the storage capacity of the each of the second plurality of zones, the ratio of the number of the invalid files in the each of the second plurality of zones to the number of all files in the each of the second plurality of zones, and a normalized value of the average value of the remaining lifetimes of the valid files in the each of the second plurality of zones;

determine a maximum value among a plurality of sums corresponding to the second plurality of zones as a compaction priority value of each of the first plurality of SST files; and determine the compaction priorities of the first plurality of SST files based on at least one compaction priority value corresponding to the first plurality of SST files, wherein an SST file having a greatest compaction priority value among the first plurality of SST files is determined as having the highest compaction priority, among the compaction priorities.

14. The compaction device of claim 12, wherein a file that is in a level involved in a compaction operation in the second plurality of zones is regarded as an invalid file.

15. The compaction device of claim 12, wherein a remaining lifetime of a valid file indicates a difference between an expected expiration time of the valid file and a current time, and the expected expiration time of the valid file is a creation time of the valid file plus a lifetime of the valid file, wherein the lifetime of the valid file is obtained by:

when the valid file is created, predicting, by using a first trained machine learning model, whether a probability of the valid file participating in an active compaction operation in the future is higher than a probability of the valid file participating in an passive compaction operation in the future, based on attribute information of a level in which the valid file is located, a higher level adjacent to the level in which the valid file is located and a lower level adjacent to the level in which the valid file is located, wherein the active compaction operation indicates a compaction operation of the valid file in relation to an SST file in the higher level and the passive compaction operation indicates a compaction operation of the valid file in relation to an SST file in the lower level, based on the probability of participating in the active compaction operation being higher than the probability of participating in the passive compaction operation, predicting the lifetime of the valid file based on history record files for compaction operations from the level in which the valid file is located to the higher level, by using a second trained machine learning model, based on the probability of participating in the active compaction operation not being higher than the probability of participating in the passive compaction operation, predicting the lifetime of the valid file based on history record files for compaction operations from the lower level to the level in which the valid file is located, by using a third trained machine learning model, wherein each of the history record files for the compaction operations from the level in which the valid file is located to the higher level and the history record files for the compaction operations from the lower level to the level in which the valid file is located records a first key range and lifetimes of SST files deleted due to the compaction operation corresponding to the each history record file, and wherein the first key range is determined based on a minimum value and a maximum value of keys of the SST files deleted due to the compaction operation.

16. The compaction device of claim 15, wherein the attribute information of the level in which the valid file is located, the higher level adjacent to the level in which the valid file is located and the lower level adjacent to the level in which the valid file is located comprises:

a ratio of a size of all SST files in the lower level to capacity of the lower level minus a ratio of a size of all SST files in the level in which the valid file is located to capacity of the level in which the valid file is located, a minimum key overlapping ratio among key overlapping ratios of respective SST files other than the valid file in the level in which the valid file is located in relation to SST files in the higher level minus a key overlapping ratio of the valid file in relation to the SST files in the higher level, a ratio of a size of all SST files generated by a compaction operation of generating the valid file to the capacity of the level in which the valid file is located, and a number of all SST files generated by the compaction operation of generating the valid file minus a number of SST files deleted due to the compaction operation of generating the valid file in the level in which the valid file is located, wherein the one or more processors is further configured to execute the instructions to:

determine a second key range of the valid file and files each of which has a key range overlapping at least part of a key range of the valid file in the higher level, select, from among the history record files for the compaction operations from the level in which the valid file is located to the higher level, history record files whose first key ranges are close to the second key range according to a first predetermined rule, and inputting a maximum value and a minimum value of keys of SST files deleted due to the compaction operation corresponding to the selected history record file and lifetimes of the SST files recorded in the selected history record file into the second trained machine learning model to predict the lifetime of the valid file, determine an SST file whose key range overlaps most with the key range of the valid file in the lower level, determine a third key range of the SST file whose key range overlaps most with the key range of the valid file and SST files each of which has a key range overlapping at least part of the key range of the SST file whose key range overlaps most with the key range of the valid file in the level in which the valid file is located, select, from among the history record files for the compaction operations from the lower level to the level in which the valid file is located, history record files whose first key ranges are close to the third key range, according to a second predetermined rule, and inputting a maximum value and a minimum value of keys of SST files deleted due to the compaction operation corresponding to the selected history record file and lifetimes of the SST files recorded in the selected history record file into the third trained machine learning model to predict the lifetime of the valid file.

17. The compaction device of claim 10, wherein the LSM-Tree is based on a LevelDB or a RocksDB.

18. A non-transitory computer readable medium for storing computer readable program code or instructions which are executable by at least one processor to perform a compaction method for Sorted String Table (SST) files stored in zones of a Zoned Namespace (ZNS) Solid State Drive (SSD), the method comprising:

determining compaction priorities of a first plurality of SST files in a first level of a Log Structure Merge Tree (LSM-Tree) based on attribute information of a first plurality of zones corresponding to the first plurality of SST files and a second plurality of SST files in a second level of the LSM-Tree, wherein the second level is adjacent to the first level and higher than the first level, a key range of each of the first plurality of SST files overlaps at least part of key ranges of SST files in the second level, and a key range of each of the second plurality of SST files overlaps at least part of key ranges of the first plurality of SST files; and performing a compaction operation on an SST file having a highest compaction priority among the first plurality of SST files by deleting the SST file in the respective zone and reclaiming the respective zone for storing a new SST file, wherein the attribute information of the first plurality of zones includes at least one of a size of valid files in each of the first plurality of zones, a size of invalid files in the each of the first plurality of zones, a number of the invalid files in the each of the first plurality of zones, and expected expiration times of the valid files in the each of the first plurality of zones, and wherein the determining the compaction priorities of the first plurality of SST files comprises:

performing weighting and summing attribute information of a second plurality of zones corresponding to each of the first plurality of SST files and a third plurality of SST files in the second level that overlap with the each of the first plurality of SST files.

* * * * *